(12) United States Patent
Agley et al.

(10) Patent No.: US 12,406,591 B2
(45) Date of Patent: *Sep. 2, 2025

(54) TRACKING CONCEPTS AND PRESENTING CONTENT IN A LEARNING SYSTEM

(71) Applicant: OBRIZUM GROUP LTD., Cambridge (GB)

(72) Inventors: Chibeza Chintu Agley, London (GB); Matthew Jonathan Chadwick, Cambridge (GB); Juergen Fink, Cambridge (GB); Sarra Achouri, Cambridge (GB)

(73) Assignee: OBRIZUM GROUP LTD., Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,148

(22) Filed: Jan. 17, 2024

(65) Prior Publication Data
US 2024/0153395 A1    May 9, 2024

Related U.S. Application Data

(63) Continuation of application No. 17/012,259, filed on Sep. 4, 2020, now Pat. No. 11,915,614.
(Continued)

(51) Int. Cl.
*G09B 5/06* (2006.01)
*G06F 3/16* (2006.01)
(Continued)

(52) U.S. Cl.
CPC .............. *G09B 5/065* (2013.01); *G06F 3/165* (2013.01); *G09B 5/00* (2013.01); *G09B 7/00* (2013.01);
(Continued)

(58) Field of Classification Search
CPC . G09B 5/00; G09B 5/065; G09B 7/00; G09B 7/02
See application file for complete search history.

(56) References Cited

U.S. PATENT DOCUMENTS 5,257,186 A     10/1993   Ukita et al.
7,536,408 B2    5/2009    Patterson
(Continued)

FOREIGN PATENT DOCUMENTS

CN    103761284 A    4/2014
CN    112990388 A    6/2021
(Continued)

OTHER PUBLICATIONS

"Extended European Search Report for EP 20194736.3 mailed Jan. 29, 2021".
(Continued)

*Primary Examiner* — Dmitry Suhol
*Assistant Examiner* — Alyssa N Brandley
(74) *Attorney, Agent, or Firm* — Dorsey & Whitney LLP

(57) ABSTRACT

Systems and methods of recommending content items are disclosed. User characteristics of a user are determined based on user engagement with one or more content items. A user model configured to predict a knowledge level of the user is generated, the user model including a set of nodes based on the user characteristics. The user model is applied to predict the knowledge level, and a recommendation is generated of at least a portion of a content item (e.g., a segment of audio/video media) based, at least in part, on the predicted knowledge level.

18 Claims, 14 Drawing Sheets

Related U.S. Application Data

(60) Provisional application No. 62/896,458, filed on Sep. 5, 2019.

(51) Int. Cl.
*G09B 5/00* (2006.01)
*G09B 7/00* (2006.01)
*G09B 7/02* (2006.01)
*G11B 27/19* (2006.01)
*G11B 27/34* (2006.01)

(52) U.S. Cl.
CPC .............. *G09B 7/02* (2013.01); *G11B 27/19* (2013.01); *G11B 27/34* (2013.01)

(56) References Cited

U.S. PATENT DOCUMENTS

| | | |
|---|---|---|
| 9,015,153 B1 | 4/2015 | Zhang |
| 9,348,920 B1 | 5/2016 | Kesin |
| 9,546,823 B2* | 1/2017 | Lee .................. F24F 1/0067 |
| 10,162,883 B2 | 12/2018 | Franceschini et al. |
| 10,558,657 B1 | 2/2020 | Cheng et al. |
| 10,945,040 B1 | 3/2021 | Bedi et al. |
| 11,232,266 B1 | 1/2022 | Biswas et al. |
| 11,302,360 B1 | 4/2022 | Gupta et al. |
| 11,409,963 B1 | 8/2022 | Nagula |
| 11,734,517 B1 | 8/2023 | Abi-akl et al. |
| 11,915,614 B2 | 2/2024 | Agley et al. |
| 2003/0018470 A1 | 1/2003 | Golden et al. |
| 2004/0095376 A1 | 5/2004 | Graham et al. |
| 2005/0108266 A1 | 5/2005 | Cao et al. |
| 2005/0283723 A1 | 12/2005 | Fish |
| 2007/0074102 A1 | 3/2007 | Kraft et al. |
| 2009/0135134 A1 | 5/2009 | Prager et al. |
| 2009/0164484 A1 | 6/2009 | Horowitz et al. |
| 2009/0198654 A1 | 8/2009 | Surendran et al. |
| 2009/0325134 A1 | 12/2009 | Harris |
| 2011/0313852 A1 | 12/2011 | Kon et al. |
| 2012/0214147 A1 | 8/2012 | Ernst et al. |
| 2013/0129308 A1 | 5/2013 | Karn et al. |
| 2014/0181109 A1 | 6/2014 | Lin et al. |
| 2014/0258472 A1 | 9/2014 | Shirey |
| 2015/0006454 A1* | 1/2015 | Supanc .................. G06N 3/08 706/25 |
| 2015/0081611 A1 | 3/2015 | Shivakumar |
| 2015/0088808 A1 | 3/2015 | Tyagi et al. |
| 2015/0088888 A1 | 3/2015 | Brennan et al. |
| 2015/0243179 A1* | 8/2015 | Zaslavsky ............ G06F 40/131 434/327 |
| 2015/0286718 A1 | 10/2015 | Wang et al. |
| 2016/0004911 A1 | 1/2016 | Cheng et al. |
| 2016/0180248 A1 | 6/2016 | Regan |
| 2017/0287346 A1 | 10/2017 | Yadav et al. |
| 2018/0011828 A1 | 1/2018 | Yadav et al. |
| 2018/0060437 A1 | 3/2018 | Gao et al. |
| 2018/0061256 A1 | 3/2018 | Elchik et al. |
| 2018/0121952 A1 | 5/2018 | Kwok |
| 2018/0189387 A1 | 7/2018 | Kim et al. |
| 2018/0218627 A1 | 8/2018 | Smith Lewis et al. |
| 2018/0261118 A1 | 9/2018 | Morris et al. |
| 2018/0268053 A1 | 9/2018 | Tata et al. |
| 2018/0268309 A1* | 9/2018 | Childress ............. G06F 40/237 |
| 2018/0295419 A1 | 10/2018 | Thielen et al. |
| 2018/0302694 A1 | 10/2018 | Noronha et al. |
| 2018/0357216 A1 | 12/2018 | Bakis et al. |
| 2018/0357318 A1 | 12/2018 | Chen et al. |
| 2018/0366013 A1 | 12/2018 | Arvindam |
| 2019/0043533 A1 | 2/2019 | Srinivasan et al. |
| 2019/0121801 A1* | 4/2019 | Jethwa .................. G06F 16/243 |
| 2019/0122766 A1 | 4/2019 | Strader et al. |
| 2019/0130185 A1 | 5/2019 | Delaney et al. |
| 2019/0155947 A1 | 5/2019 | Chu et al. |
| 2019/0335006 A1* | 10/2019 | George .................. G09B 5/065 |
| 2020/0196028 A1 | 6/2020 | Kuehne et al. |
| 2020/0250212 A1 | 8/2020 | Macartney et al. |
| 2021/0005099 A1 | 1/2021 | Agley et al. |
| 2021/0049923 A1 | 2/2021 | Brinton et al. |
| 2021/0074171 A1 | 3/2021 | Agley et al. |
| 2021/0192126 A1 | 6/2021 | Gehrmann et al. |
| 2021/0294829 A1 | 9/2021 | Bender et al. |
| 2022/0058336 A1 | 2/2022 | Anders et al. |
| 2022/0115043 A1 | 4/2022 | Gupta et al. |
| 2022/0147716 A1 | 5/2022 | Tomasi et al. |
| 2022/0147770 A1 | 5/2022 | Jain et al. |
| 2022/0189472 A1 | 6/2022 | Jepperson et al. |
| 2022/0308742 A1 | 9/2022 | Ziv et al. |
| 2022/0329911 A1 | 10/2022 | Schileru |
| 2022/0414130 A1 | 12/2022 | Master Ben-dor et al. |
| 2023/0237270 A1 | 7/2023 | Su et al. |
| 2023/0394854 A1 | 12/2023 | Polavaram et al. |
| 2023/0401850 A1 | 12/2023 | Schuler et al. |
| 2024/0086452 A1 | 3/2024 | Agley et al. |

FOREIGN PATENT DOCUMENTS

| | | |
|---|---|---|
| CN | 113392273 A | 9/2021 |
| CN | 114328983 A | 4/2022 |
| EP | 3789987 A1 | 3/2021 |
| JP | H1040260 A | 2/1998 |
| JP | 2001060206 A | 3/2001 |
| JP | 2015201185 A | 11/2015 |
| JP | 2020091857 A | 6/2020 |
| KR | 20210089340 A | 7/2021 |
| WO | 2012040621 A2 | 3/2012 |
| WO | 2016200359 A1 | 12/2016 |
| WO | 2020187118 A1 | 9/2020 |
| WO | 2022015730 A1 | 1/2022 |

OTHER PUBLICATIONS

U.S. Appl. No. 17/012,259, Notice of Allowance, filed Oct. 23, 2023, 10 pages.
U.S. Appl. No. 17/930,643, Final Office Action, filed Nov. 15, 2023, 30 pages.
Das, et al., "Incorporating Domain Knowledge to Improve Topic Segmentation of Long MOOC Lecture Videos", Journal of Latex Class Files, (2015), 14(8):1-12.
Lin, et al., "Learning by Browsing: a Web-based multimedia browsing system for learning", in Proceedings of the 39th Hawaii International Conference on System Sciences, (2006), 9 pages.
Tuna, et al., "Topic Based Segmentation of Classroom Videos", IEEE Frontiers in Education Conference, (2015), 9 pages.
23191508.3, Extended European Search Report, Jan. 23, 2024, 10 pages.
Alayrac, Jean-Baptiste, et al., "Unsupervised Learning from Narrated Instruction Videos", IEEE Conference on Computer Vision and Pattern Recognition, 2016, pp. 4575-4583.

* cited by examiner

TRACKING CONCEPTS AND PRESENTING CONTENT IN A LEARNING SYSTEM

PRIORITY

This application is a continuation of U.S. Non-Provisional patent application Ser. No. 17/012,259, filed Sep. 4, 2020, which claims priority to U.S. Provisional Patent Application No. 62/896,458, filed Sep. 5, 2019 entitled "Tracking Concepts and Presenting Content in a Learning System," both of which are hereby incorporated by reference herein in their entirety and for all purposes.

FIELD

The present disclosure relates generally to learning systems and examples of tracking concepts from a media and presenting content associated with a concept.

BACKGROUND

Traditional education or learning systems present users with learning materials suitable for a particular area or topic. In selecting suitable learning materials for the user, some systems assess the user's proficiency or knowledge level. For example, some systems rely on a user's statements regarding his or her own knowledge base or level of competence in order to assess the user's knowledge level, which may be inaccurate or at the least imprecise with respect to detailed strengths and weaknesses in a specific topics or task, etc. While a user may have a generally strong knowledge of certain processes within the job duty (e.g., a fermentation process), the user may lack specific knowledge of more specific topics related to the high level topics (e.g., genetic makeup of yeast used in fermentation processes).

Conventional knowledge assessment tools make it difficult to detect and then improve in more specific topic knowledge for users. Relatedly, conventional learning and training tools utilized by companies and other entities do not interrelate in a manner that dynamically expands or varies learning content based on a person's expanding knowledge base, skill sets, know-how, and job duty variation. Further, a content item in learning materials, such as a video of a lecture, may cover a variety of topics and concepts at various levels. In existing systems, once the system determines a topic area upon which the user needs to improve and learn, the system often presents the entire contents even if only a portion of the content item may be useful for the user's learning experience and at the appropriate level for the user. This presents technical problems that may make the learning system difficult to adapt to the user's changing knowledge base.

SUMMARY

In an aspect of the disclosure, a system for delivering content to a user includes: a concept tracker configured to access a content database including a plurality of content items and determine one or more concepts associated with each of the content items; a recommender in communication with the concept tracker and configured to recommend a concept; and a presenter in communication with the recommender and configured to display one or more segments of the plurality of content items that are associated with the concept.

In some examples, the system further comprises a user knowledge assessor in communication with the recommender and configured to receive one or more user assessment variables based on a user's response to a first content item of the content database. The recommender is configured to recommend the concept based on the one or more user assessment variables.

In some examples, at least a content item of the plurality of content items comprises transcripts of an audio/video media, and the one or more concepts associated with the content item each includes one or more time stamps. Each of the time stamps comprises a starting position and an ending position of the audio/video media.

In some examples, the presenter is configured to determine the one or more segments of the plurality of content items by: indexing the one or more segments of the plurality of content items based on the one or more time stamps associated with the concept; and determining starting and ending positions of each of the one or more segments based on a respective time stamp. The presenter is configured to display the one or more segments of the plurality of content items that are associated with the concept by replaying content item associated with the concept based on the starting and ending positions of each of the one or more segments.

In some examples, the presenter is further configured to adjust the starting and/or ending positions of at least a segment of the one or more segments.

In some examples, the presenter is further configured to adjust audio volume of at least a segment of the one or more segments near the starting and/or ending position of the segment.

In some examples, the presenter is further configured to, while the one or more segments of the plurality of contents are being displayed, display a plot comprising one or more regions representing the concept over a timeline, the regions are separated by the one or more time stamps associated with the concept.

In some examples, the concept tracker is configured to determine the one or more concepts associated with the content item by using word embedding clustering method over transcripts of the content item.

In an aspect of the disclosure, a method for delivering content to a user comprises: accessing a content database including a plurality of content items to determine one or more concepts associated with each of the content items; recommending a concept from the one or more concepts; and displaying one or more segments of the plurality of content items that are associated with the concept.

In some examples, the method further comprises: receiving one or more user assessment variables based on a user's response to a first content item of the content database. Recommending the concept is based on the one or more user assessment variables.

In some examples, at least a content item of the plurality of content items comprises transcripts of an audio/video media, and wherein the one or more concepts associated with the content item each includes one or more time stamps, each of the time stamps comprises a starting position and an ending position of the audio/video media.

In some examples, the method further comprises determining the one or more segments of the plurality of content items by: indexing the one or more segments of the plurality of content items based on the one or more time stamps associated with the concept; and determining starting and ending positions of each of the one or more segments based on a respective timestamp. Displaying the one or more segments of the plurality of content items that are associated with the concept comprises replaying content item associated with the concept based on the starting and ending positions of each of the one or more segments.

In some examples, the method further comprises performing one or more of operations comprising: adjusting the starting and/or ending positions of at least a segment of the one or more segments; or adjusting audio volume of at least a segment of the one or more segments near the starting and/or ending position of the segment.

In some examples, the method further comprises: while the one or more segments of the plurality of contents are being displayed, displaying a plot comprising one or more regions representing the concept over a timeline, the regions are separated by the one or more time stamps associated with the concept.

In some examples, determining the one or more concepts associated with the content item comprises using a word embedding clustering method over transcripts of the content item.

In an aspect of the disclosure, a system for delivering content to a user comprises a concept map tracker configured to: access a content database including a plurality of content items and determine one or more concepts associated with each of the content items; segment each of the content items into one or more segmented areas; and associate the one or more segmented areas of a content item of the plurality of content items with the one or more concepts associated with the content item.

In some examples, the system further comprises: a recommender in communication with the concept tracker and configured to recommend a concept; and a presenter in communication with the recommender and configured to display one or more segments of the plurality of content items that are associated with the concept.

In some examples, the presenter is further configured to display a first plot comprising one or more regions representing the concept over a timeline, the regions are separated by the one or more time stamps associated with the concept.

In some examples, the presenter is further configured to display a second plot comprising one or more regions representing the concept over a timeline, the regions are separated by the one or more time stamps associated with the concept. The first plot corresponds to a first area of the segmented areas and the second plot corresponds to a second area of the segmented areas.

In some examples, the concept tracker is further configured to determine the one or more concepts associated with the content items by using word embedding clustering method over transcripts of the content item.

In an aspect of the disclosure, a computer-implemented method of recommending content items is disclosed. At least one user characteristic of a user is determined based on user engagement with at least one content item. The at least one user characteristic can include a current state of a set of variables associated with user behaviors when responding to content items. The variables can include confidence, veracity, specificity of a concept in a learning space, attention level, response time, or combinations thereof. A user model configured to predict a knowledge level of the user is generated, the user model including a set of nodes based on the at least one user characteristic. The user model can include a factor graph that includes the set of nodes, and the factor graph can represent a joint probability mass function of at least one variable associated with the user. The user model is applied to predict the knowledge level. Applying the user model can include evaluating a response by the user to a particular content item. And a recommendation of at least a portion of a content item is generated based, at least in part, on the predicted knowledge level. The at least a portion of a content item can include a segment of an audio/video media including a starting position and an ending position of the audio/video media. The at least a portion of a content item can be recommended based on a concept associated with the at least a portion of the content item. In some examples, the method further includes causing display, via a graphical user interface, of the at least a portion of the content item. In some examples, feedback is received from the user or an external source and the user model is updated based on the received feedback.

In an aspect of the disclosure, one or more non-transitory computer-readable media are disclosed carrying instructions that, when executed by a processor or a computing system, cause the processor or the computing system to perform one or more methods disclosed herein.

DETAILED DESCRIPTION

Figure 1:
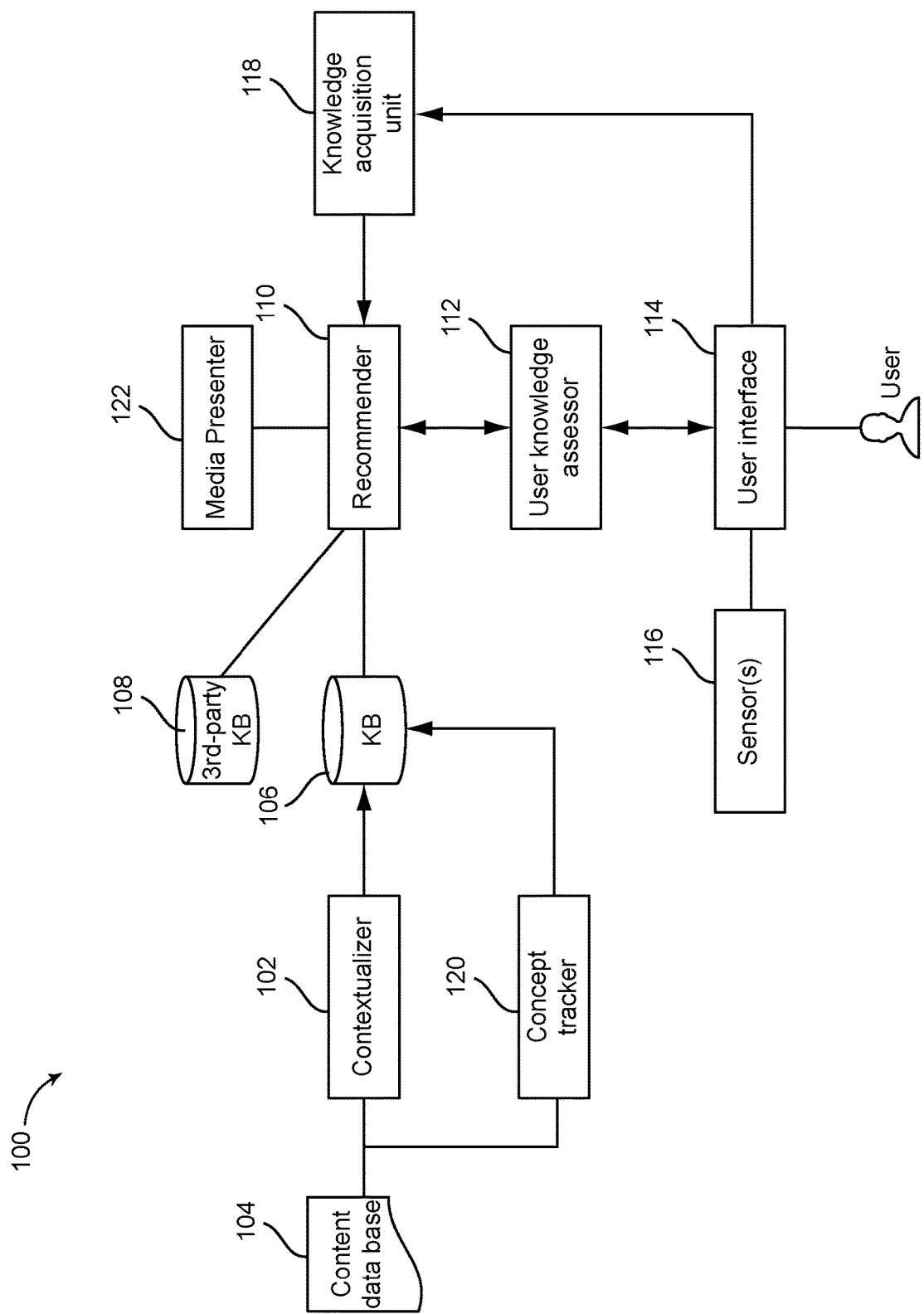
FIG. 1 illustrates a block diagram of an example learning system according to various aspects of the present disclosure.

Various embodiments of the present disclosure will be explained below in detail with reference to the accompanying drawings. The following detailed description refers to the accompanying drawings that show, by way of illustration, specific aspects and embodiments in which the present invention may be practiced. Other embodiments may be utilized, and structure, logical and electrical changes may be made without departing from the scope of the present invention. The various embodiments disclosed herein are not necessary mutually exclusive, as some disclosed embodiments can be combined with one or more other disclosed embodiments to form new embodiments.

The present disclosure includes a system capable of adaptively presenting various learning materials of various concepts to a user based on the user's understanding and competency around each concept. In some examples, the system may analyze the learning materials and track one or more concepts from each of content items in the learning materials. For example, a content item may be a video, and the system may analyze the transcripts of the video to determine one or more concepts about the video. Concepts may be covered in one or more segments of the video, each segment is represented by a time stamp including a starting position and an ending position in the video. The system may determine where a concept starts and stops to present learning materials about a particular concept to the user, without including extraneous material or content. In doing so, the system may index the video segments to be presented by the time stamps associated with the particular concept and replay each of the video segments from the respective starting position and the ending position.

In some examples, the system may adjust the starting and/or ending positions of the video segments by using a soft editing method so that the starting and/or ending position will be aligned with a key frame for natural replay. In an example, the soft editing may move the starting position back for a time period to avoid being placed in the middle of a sentence in the transcript. Similarly, the soft editing may also move the ending position further ahead until a break point in the audio track of the video segment or a key frame indicating an occurrence of an event being found. The learning materials may include other media in addition to video.

In some examples, the system may track the concepts in the learning materials by using a clustering method that converts multiple words, phrases or sentences into a vector, representing a concept. The system may use various algorithms to perform the clustering. For example, the system may use an affinity propagation algorithm with word embedding.

The various embodiments in the present disclosure facilitate a learning system to recommend learning materials about certain concepts to a user based on an assessment of the user's knowledge level about the concepts. The system may adaptively present the learning materials only relevant to the recommended concepts and display the contents associated with the concepts of interest without replaying the entire contents in the learning materials.

Turning now to the figures, a system of the present disclosure will be discussed in more detail. FIG. 1 illustrates a block diagram of an example learning and recommendation management system according to various aspects of the present disclosure. A learning and recommendation management system 100 may include a contextualizer 102 configured to access content database 104 and generate a knowledge base 106. In some examples, the content database (KB) 104 may include learning or informational content items and/or materials. Examples of learning content include videos, slides, papers, presentations, images, questions, answers. Additional examples of learning content may include product descriptions, sound clips, three dimensional (3D) models (e.g., DNA, CAD models). For example, the learning content may include testing lab procedures, data presented in an augmented reality (AR), virtual reality (VR), and/or mixed reality (MR) environment. In non-limiting examples, additional content that may be presented in an VR/AR/MR environment may include three-dimensional (3D) models overlaid in an AR environment, links of information related to product datasheets (e.g., marketing piece, product services offered by the company etc.), a script that underlies the video, voice or text that may be overlaid in an AR environment. As should be appreciated, the content can include various types of media, such as an existing video, audio or text file, or a live stream captured from audio/video sensors or other suitable sensors. The type and format of the content items may be varied as desired and as such the discussion of any particular type of content is meant as illustrative only.

The educational content items may include a wide range of information encompassing various subjects and/or topics. In some examples, the knowledge base 106 of the system including the content items, may include a graph or other type of relational or linking structure that includes multiple nodes, the nodes representing a topic in the knowledge. A cluster of nodes may represent a concept in the knowledge base 106. The graph may also include multiple edges between nodes, where the edges include weights representing probabilities of two corresponding topics (nodes) belonging to the same concept or even related concepts. Examples of a concept may include a topic, a knowledge domain, a technical area or sub-area, a technical field or any word or phrases that represent the contents of the media.

With further reference to FIG. 1, the contextualizer 102 may be configured to use the learning materials to train a concept model that includes a set of topics and probability distributions for those topics, along with probability distributions for words from the corpus. In some examples, the trained concept model may be a LDA model. The contextualizer 102 may further use the LDA model to infer probability distributions for each of the content items to be related to the topics in the model. These distributions are used to position these content items in the space.

With further reference to FIG. 1, the system 100 may further include a concept tracker 120. The concept tracker 120 may be configured to extract one or more concepts from a media, each related to one or more media segments, such as an audio/video (A/V) segment. An A/V segment in an A/V media may be related to one or more concepts. For example, the system 100 may analyze the transcripts of a video, track the concepts in the transcripts, and automatically segment the video by concepts. As another example, the system 100 may analyze images within a video, such as using optical character recognition, image segmentation or other image processing techniques, to identify frames of a video or in the case of 360 degree videos spatial areas as well, in which certain concepts may occur. In a non-limiting example, the system may determine multiple concepts related to the video. The tracked concepts may correspond to one or more video segments along the timeline, the video segments having a starting position and an ending position in the video. Multiple concepts may have overlapping video segments. In other words, a video at a particular time interval may be related to one or more concepts. The concept tracker 120 may add additional nodes to the knowledge base 106, each additional node associated with a concept. Further, the knowledge base 106 may also include one or more time stamps for each additional concept, each time stamp including a starting position and an ending position of the video from which the concept is tracked.

In some examples, the system 100 may further include a recommender 110 that accesses the knowledge base 106 and recommends content items to the user. Alternatively, and/or additionally, the system 100 may include a user knowledge assessor 112 that assesses and learns the user's knowledge level with respect to a given topic or knowledge area. In other words, the recommender may recommend content based solely on topic or may recommend content based on topic, knowledge, and user's proficiency, as well as other factors. For example, the user knowledge assessor 112 may be coupled to a user interface 114 to present recommended content to the user and receive user data as the user engages with the content. The user data may provide feedback and inputs to the system regarding the user's knowledge level about the topic under assessment. In some examples, the system may be a testing system and may display questions for users to answer, while receiving various user assessment variables. For example, the user assessment variables may include the user's veracity, the user's response time and/or confidence in answering each question etc. Additionally or alternatively, the system may detect user characteristics in engagement with other types of content (e.g., non-question based), such as eye contact, eye tracking, facial expressions, note taking, head motion, or the like, that can be used to correlate a user's understanding of a topic being presented via the content.

The user knowledge assessor 112 may analyze the user assessment or feedback variables to generate a user model representative of the user's level of proficiency or ability with respect to the presented topic. The user knowledge assessor 112 may use the user assessment variables to predict a user's knowledge level around a concept (e.g., predict whether a user will be likely to understand select topics). A user model, e.g., a student model, is a model of the state of a student, of all the states of the variables used to track a student's learning, where the variables are associated with user's behaviour responding to content items (e.g., questions). Examples of variables to model a student's learning may include: current confidence, veracity, specificity for each concept of the learning-space, attention-level, response-time, and/or a combination thereof. A user model may also include the variables corresponding predicted states. In some examples, the variables of the user model may be represented by a variable node in a factor graph and the conditional dependencies between variables are represented by factor nodes. The whole factor graph represents the joint probability mass function of the variable associated with the user.

In some examples, the recommender 110 may generate recommended content based on the user's knowledge level (or ability around a concept). When a student enters a learning space (such as one contextualized as described above) a factor graph is created for the student. With each response to a content item in the learning materials, the graph is updated (e.g., by Bayesian rule), followed by obtaining the argmax configuration of the graph by running the max-sum algorithm on the graph, where the argmax configuration of variables maximizes the joint distribution represented by the graph.

The recommender 110 may convert the argmax configuration into a point in the learning space, which represents the ideal point at which the student would be expected to be next. The ideal point would maximize the user's probability of success (in answering a question or learning from a video) in the next learning step. The recommender may select the nearest node in the space to the idea point is as the next node to visit and the process repeats. For example, the recommender 110 may generate recommendations for content that should be displayed or otherwise presented to the user that will help to maximize user's probability of success with engagement of the recommended content based on how strong or proficient the user is at the current knowledge.

With further reference to FIG. 1, the system may include a media presenter 122 coupled to the recommender 110 and configured to present the content recommended by the recommender 110 to the user. For example, based on the result from user knowledge assessor 112, the recommender 110 may generate recommendations for content that should be displayed to the user for the user to learn or improve upon certain topics/concepts. The media presenter 122 may be configured to receive the recommended concept, prepare the learning content about the recommended concept for display, and display the prepared content. In some examples, the recommended content may be directed to a particular concept related to the previously displayed content in the user's learning experience. The presenter 122 may index the video segments in one or more video content items related to the particular concept. In some examples, the presenter 122 may determine the starting and ending positions of each video segment related to the particular concept, and replay the video segments. Thus, the presenter 122 allows the system to replay portions in the learning materials that correspond to the recommended concepts without needing to replay the entire video that includes the recommended content.

To provide an effect of natural replay of the learning materials, in some examples, the presenter 122 may perform a "soft" editing on the video segment to be replayed. For example, the presenter 122 may adjust the starting and ending positions of each video segment in the video to align with a key frame. A key frame in a video is where an event occurs. The event may include various types, such as a transition of a scene in the video, a cut in the video, or where an action in the video occurs (e.g., a motion of a subject is detected). In other examples, an event may also be detected based on the transition of audio signals (e.g., a transition from silence to a start of a dialogue). In some examples, the presenter 122 may also adjust the audio at the starting and/or ending positions of the video segment while the video segment is being placed. For example, the presenter may adjust the volume of the audio in the audio track of the video segment to give the effect of fading-in at the start of the video segment and/or fading-out at the end of the video segment.

Additionally, and/or alternatively, the media presenter 122 may display a graphical representation of concepts, e.g., a plot of the concepts to give the user an intuition of where the concept being displayed fits in the entire learning contents. This is further described with reference to FIGS. 2-6.

In some examples, the system 100 may include one or more sensors 116 or other input/output devices coupled to the user interface 114. For example, the sensors 116 can capture, detect, or receive, one or more user assessment variables, e.g., a keyboard, a touch screen, a stylus, camera, or a microphone, may receive user input, such as user's answers to questions. The type of input/output device or sensor may be varied as desired. Based the answers or other detected characteristics (e.g., input time, hesitation, eye movement, facial expressions, pauses in speech, or the like), the system can determine a veracity value related to whether the user believes the answer is correct, whether the user enjoys the presented learning content, as well as other feedback information related to the user's engagement with the content. A touch screen may display a confidence slider for user to select when the user answers a question, where the touch screen detects the user's gesture and determine a position in the slider to calculate a confidence value. The sensors may also include touchpad sensor, pressure sensor. The sensor may also include wearable sensors, such as sensors that may be installed on a user's fingers (with or without gloves) to assess the way the user interacts with the user interface. Other sensors may include system timer to measure user's latency in answering questions.

In some examples, the system 100 may include a knowledge acquisition unit 118 that is configured to acquire user knowledge characteristics (e.g., feedback information), either directly or indirectly from the user, and/or external or non-user based information to refine the recommender 110. For example, the knowledge acquisition unit 118 may acquire external or non-user based information, such as an expert's (a person or a source of information that the system knows has proper knowledge around one or more concepts) knowledge, that can be used to refine the user model in the recommender 110. In an example, the system may utilize the topic assessment variables from the expert to predict the specificities of nodes about a concept, which can enhance the analysis of the user's proficiency of those topics based on the predicted specificities of nodes about the concept. For example, a node in a graph may represent a video. When an expert determines that the video is strongly related to a topic (e.g., the expert provides input that a video related to a topic meets quality standards or other metrics), and the user engages the video in such a way that the feedback information appears to indicate that the user understood the concepts presented (e.g., the user also says that the video is good or otherwise is a quality or conveys information well) the system may increase the probability of the user to have a strong knowledge related to the presented concepts.

In some examples, the recommender 110 may also access a third-party knowledge base 108 and/or a third-party system may access the trained knowledge base 106. As content (e.g., knowledge base 106, 108) can be stored or arranged in a weighted graph with the weighted edges within the graph, accessibility or permission to access a selected subset of the graph (e.g., a cluster of nodes) can be represented by stored edges between nodes. In other words, the system can link together content across multiple databases and set perimeters based on the weighted edges, where the perimeters may define accessibility to a particular set or cluster of nodes (e.g., define whether a particular user can engage with a selected item of content). This arrangement allows users or database owners (e.g., companies owning a content library) to provide access to others (e.g., users or other companies) across the database. This type of knowledge base sharing in a graph structure among different systems allows certain nodes to be accessible to one or more systems (of one or more organizations) that need content in a particular area (or around one or more concepts).

Figure 2:
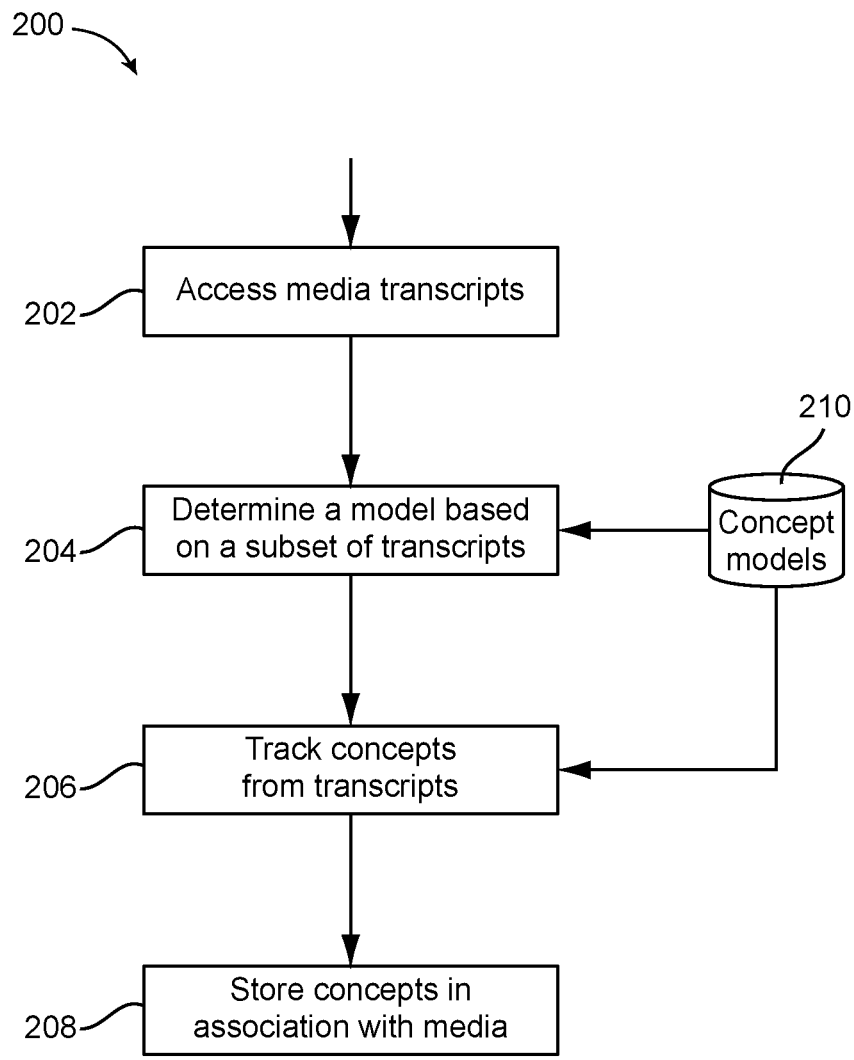
FIG. 2 illustrates an example process of tracking concepts from a media according to various aspects of the present disclosure.

FIG. 2 illustrates an example process of tracking concepts from a media according to various aspects of the present disclosure. In some examples, a process 200 in FIG. 2 may be implemented in the concept tracker (120 in FIG. 1). The process 200 may include accessing media transcripts at 202. In some examples, the media may include audio and/or video contents, and the transcripts may be obtained from transcribing an audio or an audio track in a video. In other examples, the transcripts may also include text recognized in the video content. For example, text may be extracted from images frames in a video, e.g., text in road signs, and recognized (e.g., via optical character recognition (OCR)). In other examples, other assessment tools, such as image segmentation, may be used to separate a video or video frame into multiple spatial areas based on which image recognition and concept tracking may be performed.

The process 200 may provide the media transcripts to a concept model to track concepts from the transcripts. The process 200 may extract one or more concepts from the transcripts, each related to one or more media segments, such as A/V segments. For example, if the media is a video, each tracked concept may be related to one or more video segments in the video. A video segment in the video may thus be related to one or more concepts. In a non-limiting example, the tracked concepts from a video may indicate five top concepts, with each concept distributed variously in the video. For example, the video may talk a little about concept A in the beginning and towards the end, whereas concept B is covered in the middle of the video. The association of each concept to the distribution in the video is indicated by a time stamp. For example, concept A is covered by the first 10 minutes and last 10 minutes of a 30-minute video. In such case, concept A may have a first associated time stamp including a starting position of 0 minute and an ending position of 10 minutes, and a second associated time stamp including a starting position of 20 minutes and an ending position of 30 minutes. Concept B is covered by the first 5 minutes of the video, and may thus have an associated time stamp including a starting position of 0 minute and an ending position of 5 minutes.

In some examples, the process 200 may store the tracked concepts association with the media at 208. The concepts may be stored in a database, e.g., knowledge base 106 (in FIG. 1). Each tracked concept may correspond to one or more media segments of the media, e.g., a video, from which the concepts are tracked, each media segment includes a starting position and an ending position in the video. Multiple concepts may have overlapping video segments. In other words, a video at a particular time interval may be related to multiple concepts. The concept tracker 120 may add additional nodes to the knowledge base 106, each additional node associated with a concept. Further, the knowledge base 106 may also include time stamps for each additional concept, each time stamp including a starting position and an ending position of the video from which the concept is tracked.

In a non-limiting example, the resolution of time intervals (for time stamps) can be course or fine, depending on the expense of the implementation and the data given, but it could range from each half or quarter of a video down to phrase level potentially. In some examples, the notes about concepts in the database may be in the form:

```
interval-start-milliseconds
interval-end-milliseconds
concept-1 x
concept-2 y
. . .
concept-n z
``` where x,y,z are numbers typically between 0,1 which represent e weight at which the interval of the video is associated with a given concept.

Figure 3A:
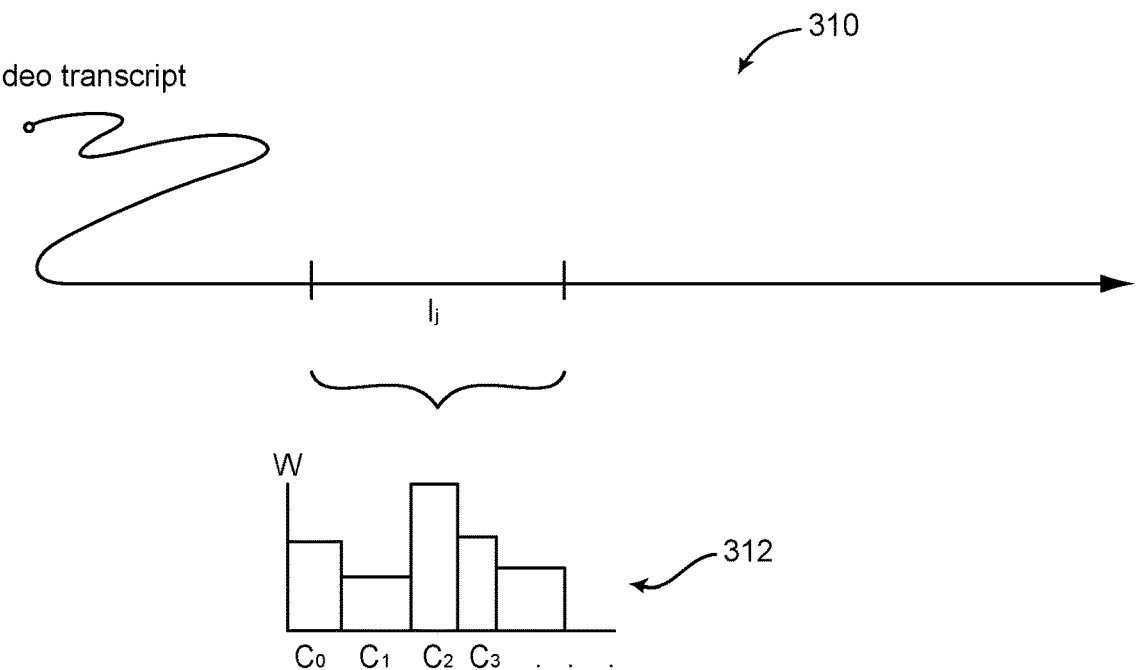
FIG. 3A illustrates an example of a time interval in a video associating with multiple weighed concepts according to various aspects of the present disclosure.

Now, FIG. 3A illustrates an example of a time interval in a video associating with multiple weighed concepts according to various aspects of the present disclosure. The learning system may analyze the video transcript 310 (or other media in other forms) and assign a number of concepts to a sequence of time intervals spanning or partial-spanning a video. In the example in FIG. 3A, a time interval $I_j$ may be assigned multiple concepts C0, C1, C2, . . . , each having a weight. A distribution of concepts 312 shows the distribution of concepts in a set of weights Wi. The weights may be represented by functions $f(c,i)=0 \ldots 1$, $c=0 \ldots 0$ where C is a number of concepts, where $f(c,i)=0 \ldots 1$ is a real number between 0 and 1 representing the probability of the interval i being associated with concept c, or the weight (unnormalized probability) of concept c in interval i, e.g., the extent to which interval i is associated with concept c. In the simplest case these functions would take the form of matrices representing probability distributions over each concept.

Figure 3B:
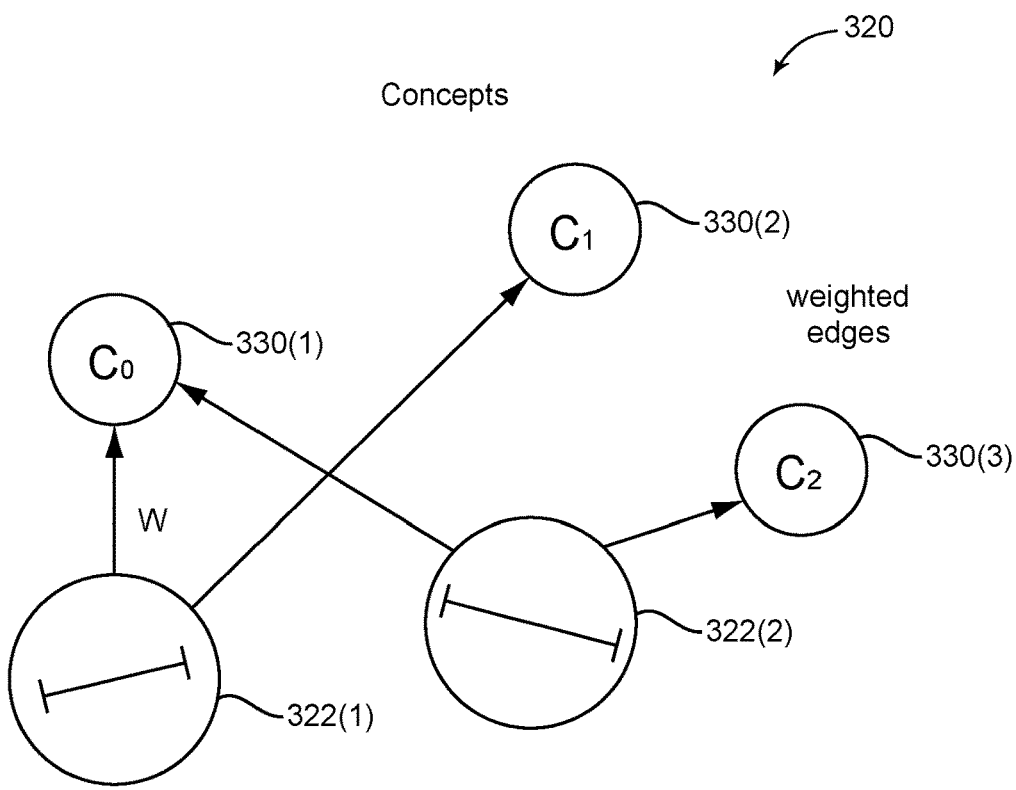
FIG. 3B illustrates an example graph representing multiple time intervals and concepts according to various aspects of the present disclosure.

FIG. 3B illustrates an example graph representing multiple time intervals and concepts according to various aspects of the present disclosure. In a graph 320, the learning system may analyze the transcript (e.g., 310 in FIG. 3A) and generate multiple nodes and edges. For example, a node may represent the content of the media for a time interval (e.g., 322(1), 322(2)). In some examples, a time interval may be the interval $I_j$ (in FIG. 3A). A node in the graph 320 may also represent a concept, e.g., 330(1), 330(2), 330(3), each respectively representing concepts C0, C1 and C2. The graph 320 may further include weighed edges, each connecting between a pair of nodes. In the example in FIG. 3A, node 322(1) and 330(1) are connected by an edge, node 322(1) and 330(2) are also connected by an edge. An edge represents an association between the concept and the content of the media to which the edge is connected. In some examples, an edge may have a weight, representing the extent or degree of association between the concept and the content of the media to which the edge is connected. For example, the weight of the edge may be based the function $f(c,i)$ as previously described. In some examples, the graph 320 may be added to the contextualization graph, such as the graph representing the knowledge base 106 (in FIG. 1).

Figure 3C:
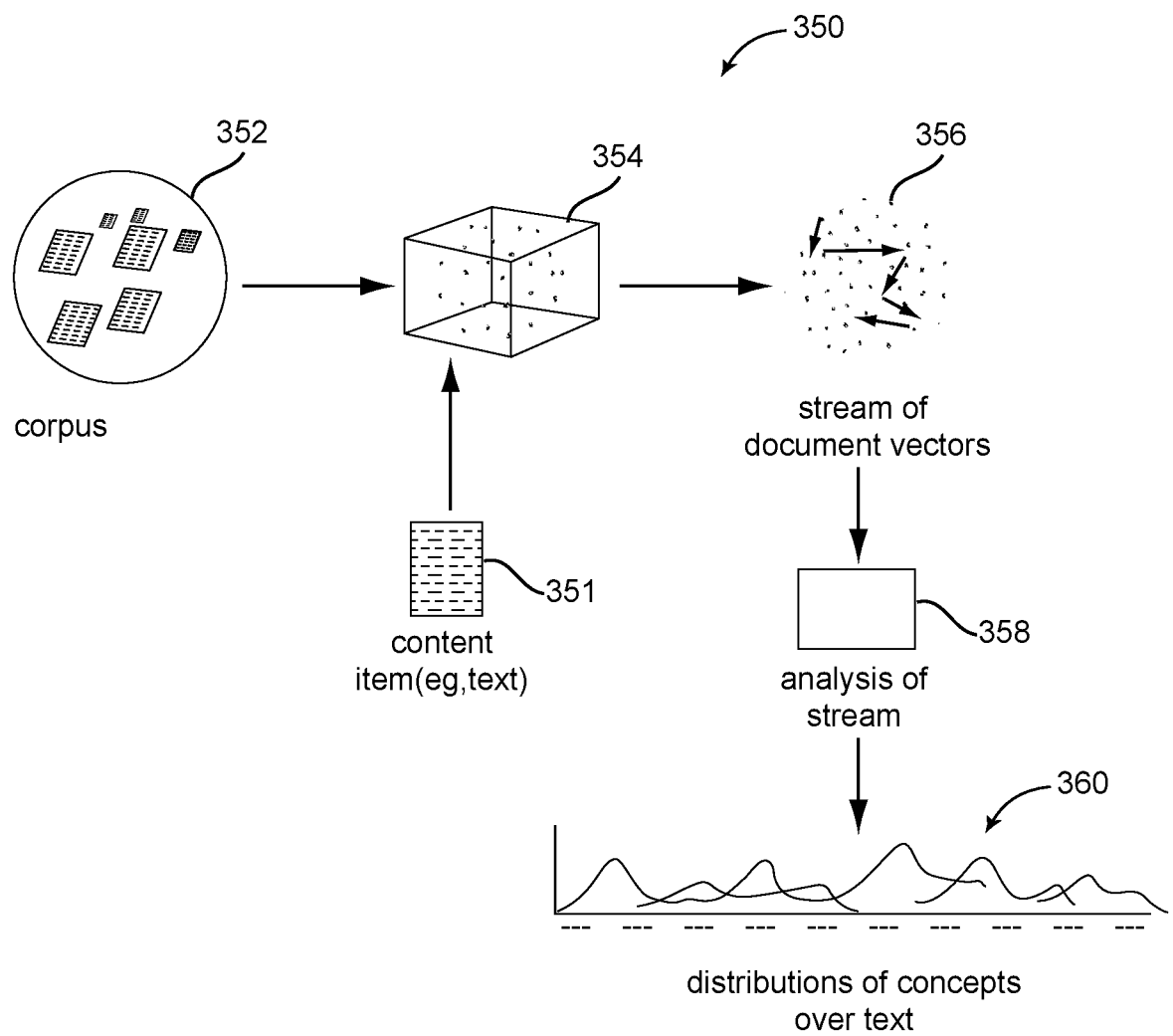
FIG. 3C illustrates an example schematic flow of information in concept track according to various aspects of the present disclosure.

FIG. 3C illustrates an example schematic flow of information in concept track according to various aspects of the present disclosure. In some examples, in obtaining the concepts, learning system 350 may automatically learn the set of concepts from the data in the media (e.g., text, video transcripts, other contextual information etc) in a non-supervised manner In the example in FIG. 3C, the learning system 350 may be configured to analyze a content item 351 (e.g., text data, transcript from a video, or recognized text in a document image) using the corpus 352 and generate stream of document vectors (concepts) 356. The system may further analyze the vectors at 358 to assign the probabilities/weights for the concepts. In the example in FIG. 3C, the system may generate a distribution of concepts over text (media) 360. This is further explained with reference to FIG. 3D.

Figure 3D:
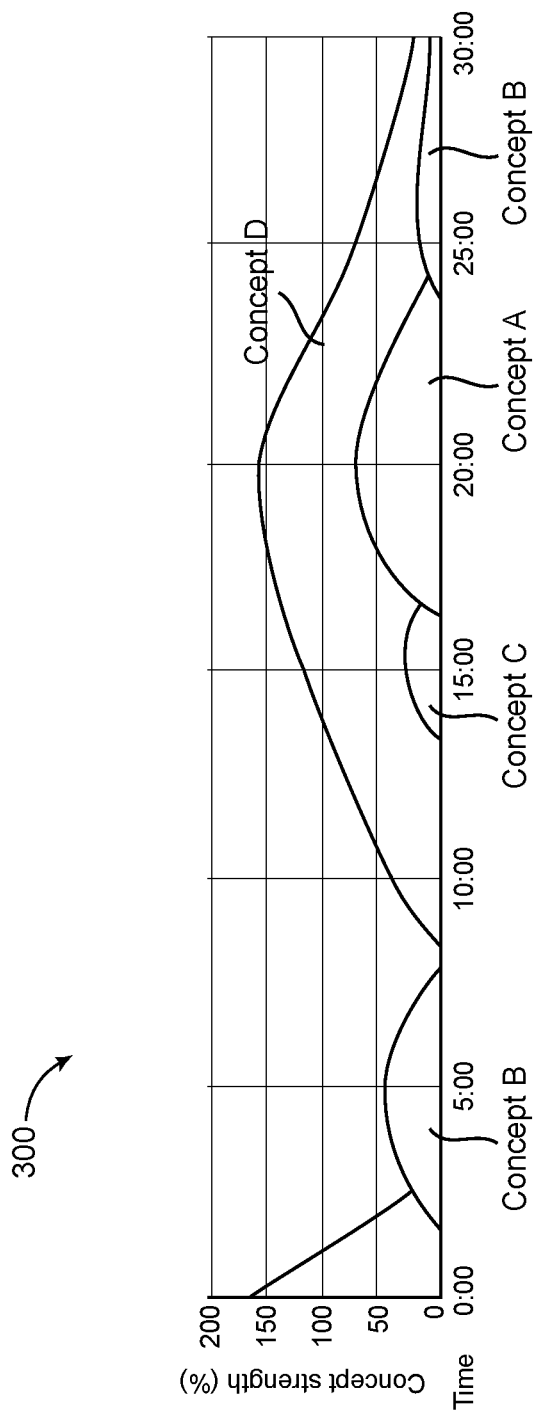
FIG. 3D illustrates an example of multiple concepts in a media according to various aspects of the present disclosure.

Now, FIG. 3D further illustrates an example of concept tracking in a media according to various aspects of the present disclosure. In some examples, a distribution of concepts over text in a temporal order may be shown in multiple concept regions, each region having a time stamp indicating a time interval having a starting position and an ending position in the media. A time interval may be associated with one or more concepts and displayed in different shades and/or colors. Given a time interval the system may predict the extent the media at the time interval is associated with each of the concepts. For example, the system may determine a matrix representing distributions of multiple concept, each associated with a probability or weight. In some examples, the system may determine a list of concepts associated with the time interval. For example, the system may determine the list of concepts comprising the concepts whose weights or probabilities are above a threshold. In some examples, given a time interval which overlaps with a section of no-transcript or nonsensical footage, the system may return no concepts.

With further reference to FIG. 3D, a video runs from 00:00 min to 30:00 min, and various concepts: concepts A, B, C and D were extracted. By way of example, the concepts A-D may be extracted by the process 206 (in FIG. 2). In FIG. 3D, concept A is covered in the video during 16:00-25:00 minutes; concept B is covered in the video during 2:00-7:00 minutes and 25:00-30:00 minutes; concept C is covered during 14:00-17:00 minutes and concept D is covered during 9:00-30:00 minutes. Although concepts A-D are explained in the context of one video with a duration of 30 minutes, concepts can be tracked over multiple videos and a concept can be associated with any number of time intervals of one or more videos. As shown in FIG. 3D, each concept region may have a variable height indicating the concept strength. This may be obtained from the concept tracker (e.g., box 206 in FIG. 2).

Returning to FIGS. 2 and 3C, methods for tracking concepts from the transcripts (e.g., block 206 in FIG. 2, block 354 in FIG. 3C) are further described. In some examples, the tracking of concepts is a clustering problem, in which a word, phrase or a sentence in the transcripts belong to a cluster. The clusters can be trained with corpus (es) relevant to the contents of the media. At a high level, a clustering method may include word embedding, in which a word, phrase or a sentence in the transcripts is converted by a concept model to a vector. A vector may represent a concept and may include a cluster of relevant words or phrases. For example, as illustrated in FIG. 3C, a stream of document vectors 356 may be determined from the clustering method. When converting each word, phrase, and/or sentence to a vector (e.g., a concept), a weight or probability value may also be calculated. This probability value may correspond to the concept strength associated with each word, phrase and/or sentence relative to each tracked concept. In some examples, a word embedding may be used in an affinity propagation (AP) algorithm, which is further described in the present disclosure.

In AP, in forming the input similarity matrix, a strategy of biasing the values on the main diagonal is used. The values to be biased are the positions on the main diagonal corresponding to the most relevant words, e.g., indices of vectors corresponding to those words as they appear in the word embedding vector space. In some examples, various word embedding methods may be used. For example, GloVe word embedding may be used.

In reducing the number of exemplars in the AP algorithm, if the distance between values on the main diagonal are large enough (e.g. $-2.0$ and $-1000.0$) then AP may converge to a set of exemplars with order equal to (or very nearly equal to) the set of largest values on the main diagonal (e.g., for exemplars values having $-2.0$).

In some examples, the AP method may choose the words to bias based on a known model, e.g., a LDA model. For example, the system may choose the first words in each topic for the best known model in LDA, and give an intuitive bias based on topic probability and word probability. The system may choose biases two-three orders larger than the default values on the main diagonal. This means there will be a good interval to choose biases from. One or more selected corpuses will be used for the AP algorithm.

In some examples, a system for implement the concept tracking method (e.g., 100 in FIG. 1) may be configured to discover word synonyms by using a pretrained word embedding (e.g., GloVe) on a corpus by scanning for synonyms for words from the resulting vocabulary using a similarity distance. In some examples, the system may use a cosine similarity to measure the distance between collection of words. This will result in distance values to be contained between [−1, 1]. The cosine distance measures the angle between vectors which represent words. In a large corpus, similar words point in the same direction, while non-connected words are orthogonal or point in a different direction. By using the cosine similarity, it is expected that semantically close words have values close to 1.0.

In some examples, the system may determine distance metrics between equal collection of words using cosine similarity measures. The system may define that two sentences are aligned semantically if the orders of the grammatical parts in the two sentences are the same. When the words in the sentences are aligned semantically, the system may concatenate the corresponding vectors for two equal collection of words (referred to as sentences) and then use cosine similarity between them.

Alternatively, and/or additionally, the system may determine a square matrix of cosine distances by computing the closeness of each word vector in a sentence against all word vectors in another sentence. The system may choose the induced cosine norm (e.g., vectors of cosines similarities). The cosine similarity may be computed between the resulting vectors and each original line of the matrix. This metric may be able to capture similarity between sentences even when they are misaligned. Although cosine distances are described as an example, other distance metrics between vectors may also be used for synonymy.

In some examples, the system may use iterative biasing of affinity propagation to help obtain a constraint on the number of clusters in an unsupervised manner in a meaningful way. This problem naturally translates, in AP domain, to how is one to choose apriori points in the vector space to bias on the main diagonal of the similarity matrix and how is one to choose an appropriate value for those biases? In some examples, the system may be configured to run AP for a number of iterations which is scaled by a 0.0<f≤1.0 factor of the total number of iterations that it takes AP to terminate (i.e. either consume a maximum preset number of iterations or reach convergence with respect to a certain threshold). This process can be an iterative process that runs recursively. At each iteration one can use two alternative strategies on how to update the new iteration number of iterations for the AP (i.e. either use the first iteration value throughout, or update the number of iterations each time by applying the same scaling approach for each previously used number of iterations). Regarding the final output, the system may also use alternative strategies. For example, the system may use the output of the last iteration or start a new AP with biased points on the similarity matrix but let it run until it terminates.

Now, the system may implement the iterative biasing AP by performing various operations comprising: 1) start with the default setup for the similarity matrix (e g, main diagonal is based on the median method) and determine the number of iterations necessary to achieve convergence; 2) use a fraction of the number of iterations discovered at 1) to run the AP on the same setup; let the above fraction of iterations be f; 3) use the resulting exemplars at 2) as points to be biased on the main diagonal of the similarity matrix; each discovered exemplar has an associated self-confidence value sc; set the value of the corresponding exemplar on the main diagonal of the similarity matrix to −|sc| and nut AP; 4) next one will employ several recursive strategies for a several preset number of runs n; the first strategy 4.a) may be using the same value off redo points 2) and 3) n−1 times; the second strategy 4.b) may be an alternative to 4.a)—use a new fraction of iterations (i.e. use the number of iterations necessary to converge AP at point 3) and divided by the same fraction used initially at point 2)); and 5) collect the results of the iterative process at 4) using two alternating strategies: 5.a) the result collected by the final run at 4) is returned; and 5.b) use the result collected by the final result at 4) to collect exemplars and their top-n (e.g. top 5) closest points as points to bias for a final AP which will nut until convergence (or a large number of iterations is consumed); the bias value for the exemplars is their self-confidence (which is usually a small enough number) while for the rest of the words a preset value of −2.0 was used.

The concepts associated with a video may dynamically change over time (as shown in FIG. 3D), thus the word embedding based AP methods may be suitable for tracking concepts from short pieces in the transcripts of the video materials as opposed to the LDA, which is suitable for understanding a piece of materials as a whole. Although various affinity propagation methods are described, other methods may also be used to track the concepts from a video. For example, topic dominance scoring algorithm, as described by A. Gherega: in "Mallet topic modelling evaluation—An interpretation," available at http://mallet.cs.umass.edu/diagnostics.php, can also be used.

Returning to FIG. 2, tracking concepts from the transcripts at 206 may use a concept model previously trained using a corpus. In some examples, a trained concept model may be suitable for an application domain, for which the corpus used for training the concept model were also obtained from the same application domain. In some examples, before tracking concepts from the transcripts, the process 200 may determine a suitable concept model to use at 204. Multiple concept models 210 may be pre-trained and stored. For example, some models may be trained using corpus(es) from scientific domain, some from sports, and some from media etc. If the user of the learning system is navigating through scientific learning materials (e.g., related to gene research), then properly trained concept model using the corpuses selected from scientific domain should be used. In some examples, determining the model at 204 may be based on a subset of transcripts. For example, the process 204 may access samples of the words from the transcripts of the video materials and determine the domain in which the contents of the video are, and select the model suitable for the domain.

In some examples, the process may also access the concept models 210 and select samples of words from the corpuses used to build each concept model. The process may compare those samples of words from the corpuses associated with a respective model and samples of words from the transcript, to determine a suitable concept model to use.

In tracking the concepts (e.g., 206), the system (e.g., 100 in FIG. 1) may select a concept model for the domain. For example, if the word embedding is used in tracking the concepts, the system may select the suitable word embedding model for the domain. In some examples, the word embedding model is built based on corpus(es) obtained from a particular domain.

Figure 4A:
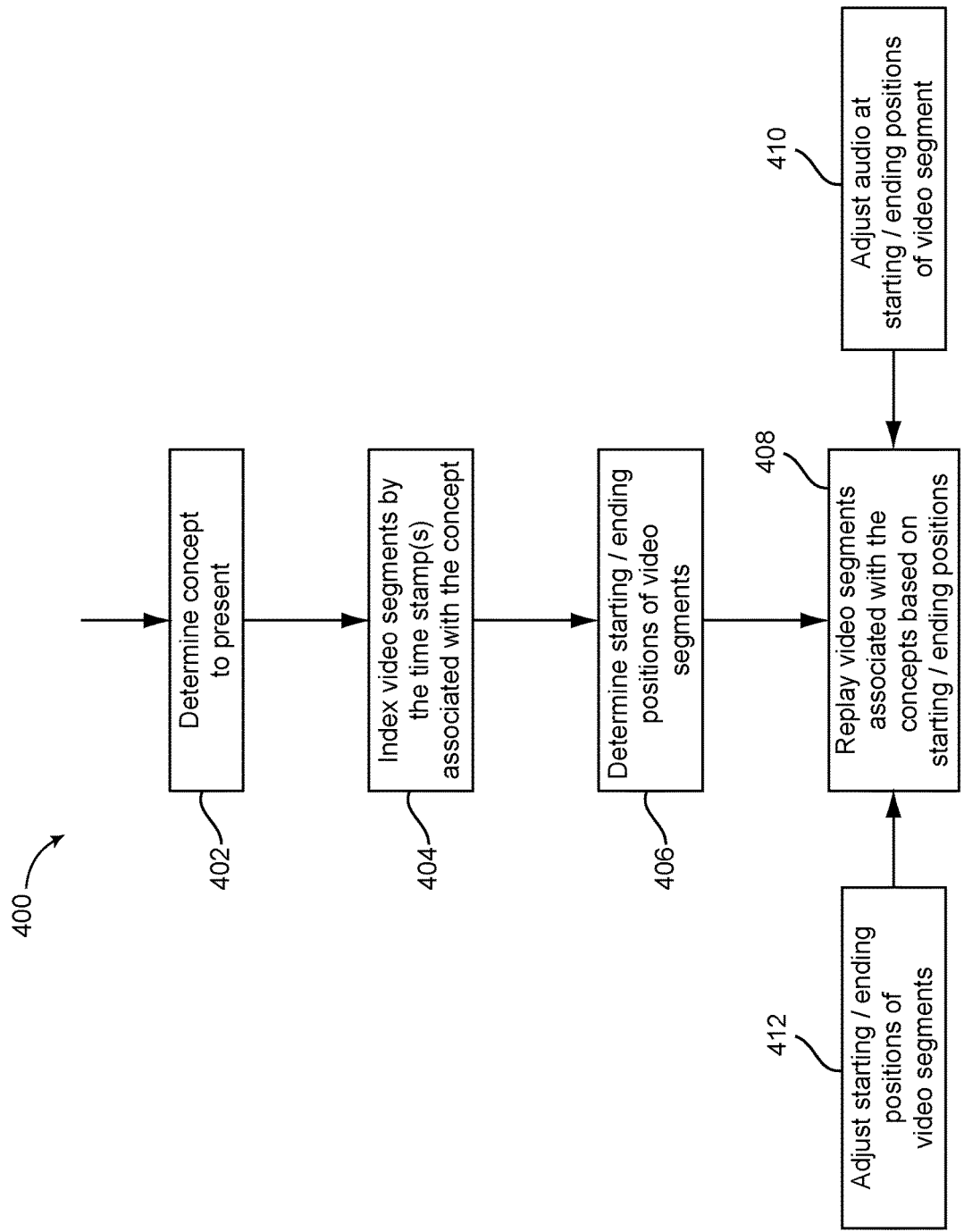
FIG. 4A illustrates an example process of presenting video segments associated with a concept according to various aspects of the present disclosure.

FIG. 4A illustrates an example process of presenting video segments associated with a concept according to various aspects of the present disclosure. In some examples, a process 400 in FIG. 4A may be implemented in the media presenter 122 (in FIG. 1). Now, FIG. 4A is described in detail with reference to FIG. 1 by way of example. The process 400 may include determining concept to present at 402. For example, the concept to present may be obtained from the recommender 110 (in FIG. 1), which will be further described with reference to FIG. 6. The concepts may be tracked from the transcripts, by, for example, the concept tracker 120 (in FIG. 1). Examples of concepts tracked from the transcripts are illustrated in FIG. 3D.

With further reference to FIG. 4A, the process 400 may index video segments by the time stamp(s) associated with the concept at 404; determine starting and ending positions of the video segments at 406, and replay the video segments associated with the concepts based on the starting and ending positions, at 408. A time stamp of a video segment in a video may include a starting position and an ending position. As described above, each of the concepts extracted from the transcripts may be associated with one or more time stamps each including a time interval indicated by the starting and ending position in the video. Thus, determining the starting/ending positions of the video segments 406 may include accessing the time stamp(s) of the concept from the database (e.g., knowledge base 106 in FIG. 1). Replaying the video segments may include continuously playing each of the video segments from the respective starting position to the respective ending position of the video segment. This is further described with reference to FIGS. 5A and 5B.

Figure 4B:
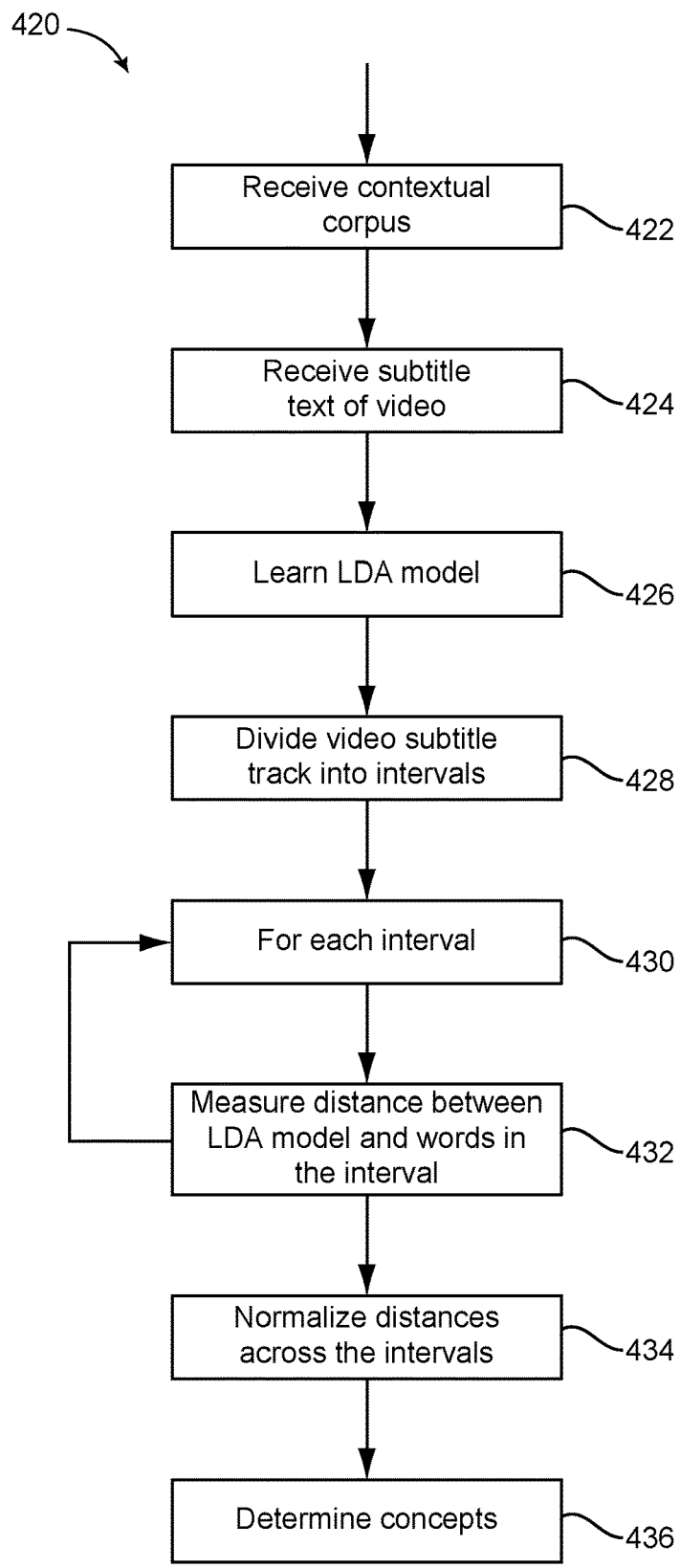
FIG. 4B illustrates an example process of determining concepts in a video according to various aspects of the present disclosure.

FIG. 4B illustrates an example process of determining concepts in a video according to various aspects of the present disclosure. A process 420 may be implemented in the concept tracker 120 (FIG. 1), for example. The video may be stored in the content database 104 (FIG. 1). Process 420 may include receiving contextual corpus at 422. For example, the corpus may be 352 (in FIG. 3C). The process may also include retrieving subtitle text from the video. Process 420 may further learn a LDA model from the corpus at 426 as previously described. The process may further divide the video subtitle track into intervals at 428. In a non-limiting example, the length of an interval may be approximately the length of a phrase.

For each interval (430), the process may measure the distance between the learned LDA model and the words in the interval at 432. For example, the process 432 may measure the word-vector weighted Jaccard distance between the top-n words of the LDA model and the words in the interval. Word-vector weighted Jaccard distance is weighted Jaccard distance with the weighting function being the inner-product between the word vectors of the words being compared. This process may be repeated for each of the intervals. Once all of the intervals are processed, the process 420 may further normalize the distances across all of the intervals at 434, and determine the concepts based on the normalized distances at 436.

Figure 4C:
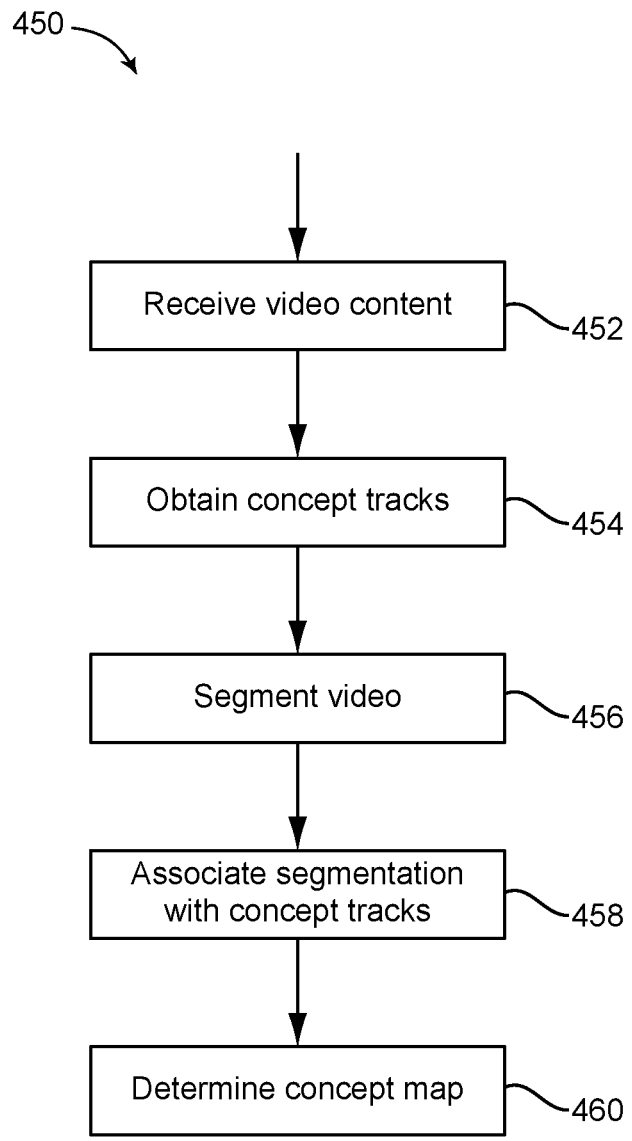
FIG. 4C illustrates an example process of determining concept map in a video according to various aspects of the present disclosure.

FIG. 4C illustrates an example process of determining concept map in a video according to various aspects of the present disclosure. Whereas concept tracks represent concepts in a time domain, concept map tracks extend concept tracks to space as well as time. A video content, e.g., a VR video (360 video) may have an associated concept map track, which is a layer describing which areas of the video are about which concepts being learned at any one time. A process 450 for generating concept map tracks may be implemented in the concept tracker 120 (FIG. 1), for example. Process 450 may receive video content at 452. The video content may be retrieved from the content database 104 (in FIG. 1). The process may further obtain the concept tracks at 454, for example, using the process in 420. The process may further segment the video at 356, and associate the segmentation result with the concept tracks at 458, and determine a concept map at 460. In some examples, the process for segmenting the video at 456 may segment the video (or each frame of the video) into multiple areas in spatial domain. For example, a video frame may be segmented into a center area and other non-center areas. In segmenting the video, the process perform image segmentation over the video frames. In some examples, the process may use a machine learning technique to provide initial semantic segmentation of the video.

In some examples, in associating the segmentation with the concept tracks at 458, the process may use also a machine learning technique to learn which area is relevant to which concept. In some examples, the system (e.g., 100 in FIG. 1) may use a VR video to enhance learning by tapping into innate spatial memory. For example, the system may allow the students to navigate through a video and track the area nearest the center of the field of view the student moves the 360 degree video to (e.g., using a cursor device, a headset gyroscope, or gyroscope in mobile device) In some scenarios, the system may prompt the student to focus on areas they think are relevant to what is being taught, and track which areas and therefore concepts the student is probably attending to. Based on the concept map, the system may know which areas are relevant to the flow of events, and thus can guide student's attention to those areas.

Figure 4D:
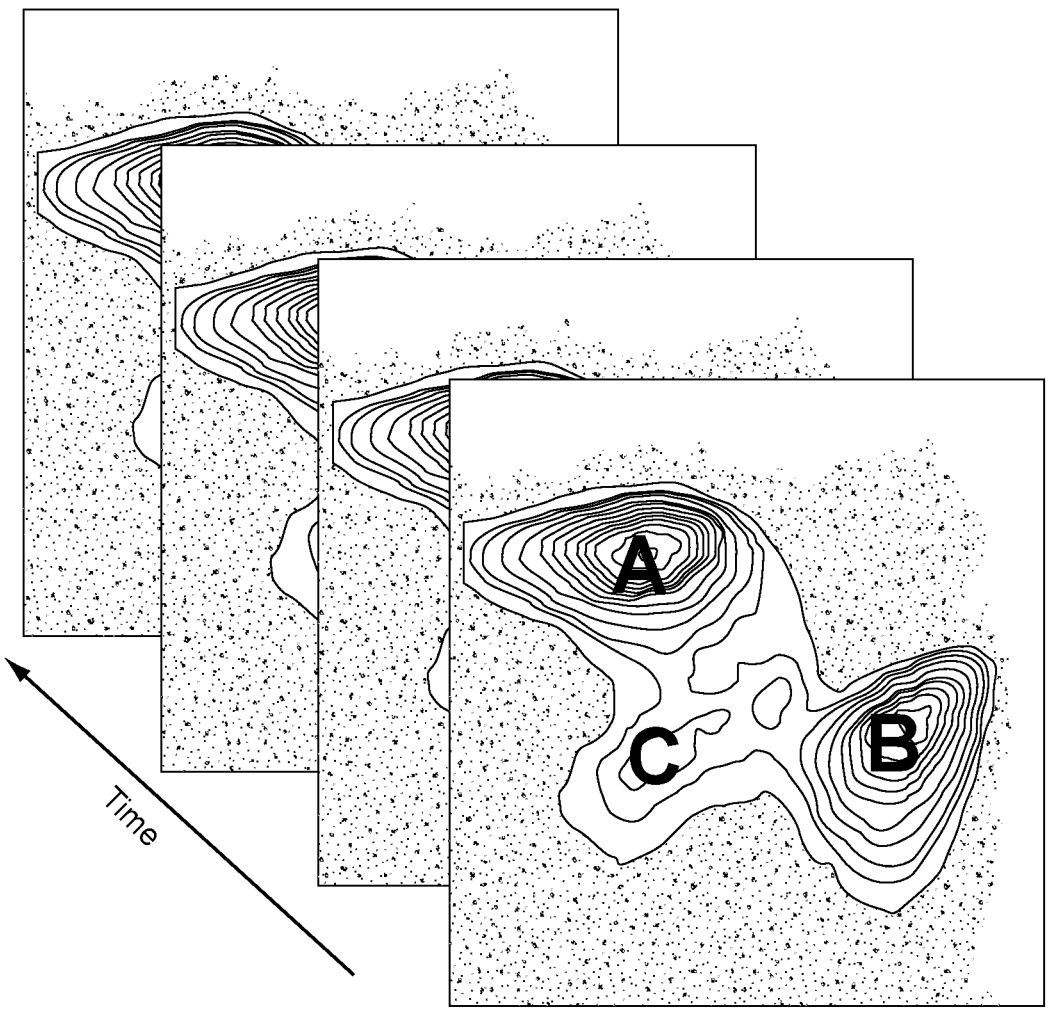
FIG. 4D illustrates an example of a concept map according to various aspects of the present disclosure.

FIG. 4D illustrates an example of a concept map according to various aspects of the present disclosure. As shown, a video frame may be segmented into several areas, such as areas A, B, and C. The concept map includes the associations of these areas with respective concepts. In a hypothetical scenario, a student is learning a particularly intricate experiment, one that would be expensive or infeasible to do in real life due to unavailability of a particular facility, laboratory, or machinery, or due to travel restrictions. The system may record and play a 360 degree video of the experiment performed by an expert. As the students watch the video, the system may prompt the students to focus the view on the things in the video most pertinent to the context. The system may display the concept map track to the students and prompt them to click on sequences of areas to indicate what should happen next. In such way, the students will learn to associate the video's events with concepts. Additionally, the system may provide interactive virtual overlays with context-dependent 2D/3D tools, annotations and questions, multiple-choice assessments.

Figure 4E:
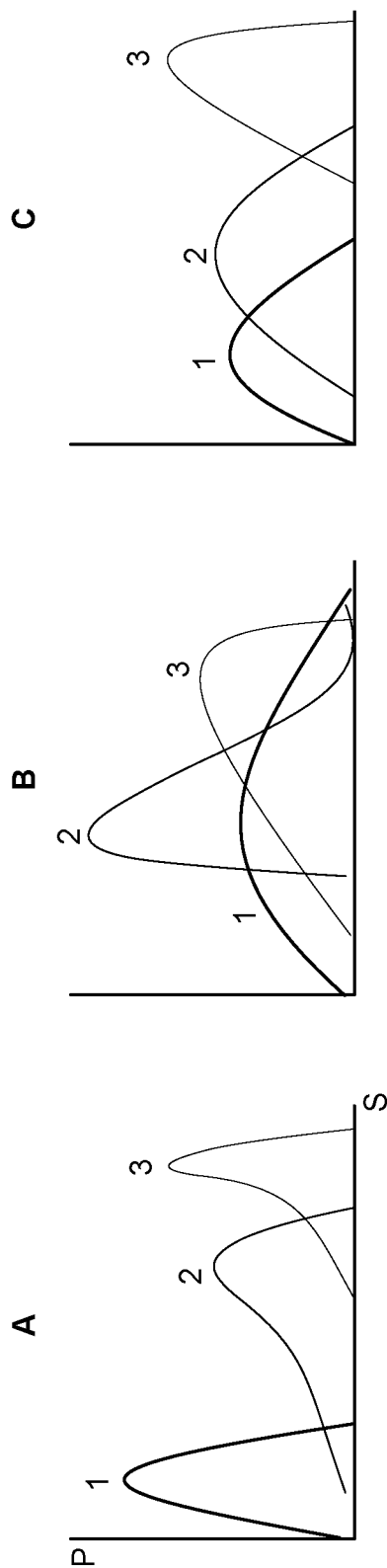
FIG. 4E illustrates an example of a concept map graph according to various aspects of the present disclosure

FIG. 4E illustrates an example of a concept map graph according to various aspects of the present disclosure. Further extending from the concept track (in time domain) and the concept map track (in time and spatial domains), the concept map graph concerns with time, space and dependencies between concepts in time and space. In FIG. 4E, each concept area (e.g., hotspot "A," "B," and "C" in FIG. 4D) has a distribution of concepts 1, 2 and 3. That is, the concept map graph encodes dependencies between concepts in both time and space. In this manner, the system can associate concepts with positions within a video, e.g., spatial distribution, such that certain videos may be divided into both time and spatial components and only relevant areas may be associated with a particular concept. For example, data indicating the location within a video (or video frames) may be encoded along with each concept. To assess a spatial distribution of concepts, image analysis, such as computer vision, may be used to analyze pixels within the video and spatial areas of the video, and correlate those pixel areas to a particular concept or idea. Alternatively, and/or additionally, concept tracking as previously described may be performed over the text in certain locations of the video. The user may learn these dependencies through interactive tools.

With further reference to FIGS. 4E, A, B, & C are combinations of distributions of concepts 1, 2 and 3, where S means specificity and P means probability. A "S" with a low value may indicate 'not much about' and an "S" with a high value may indicate 'very much about'. P indicates the probability for the level of specificity to be true (or a confidence in which the concept has that level of specificity). Then the three hotspots correspond with the combinations, A being mostly about concept 3 and not much about concept 1.

Figure 5A:
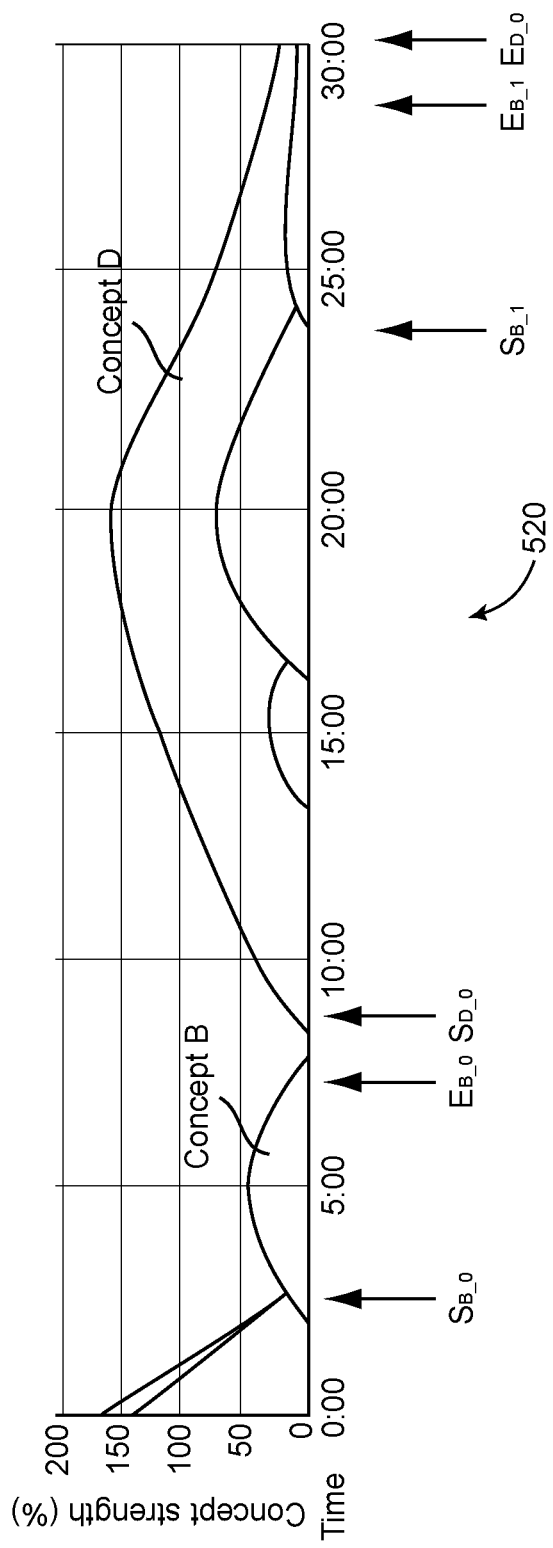
FIG. 5A illustrates an example graphical user interface for presenting video segments associated with a concept according to various aspects of the present disclosure.

FIG. 5A illustrates an example graphical user interface for displaying multiple concepts tracked from a video according to various aspects of the present disclosure. In some examples, the concepts associated with a video 520 may be extracted from the transcripts which are also shown in FIG. 3D. Each concept may be represented by a region. The regions representing the concepts are separated by the one or more time stamps associated with the concept. By way of example, the time stamps for the concepts in FIG. 3D are shown in FIG. 5A. For example, concept B may have a first time stamp including a starting position $S_{B\_0}$ and an ending position $E_{B\_0}$, and a second time stamp including a starting position $S_{B\_1}$ and an ending position $E_{B\_1}$. Similarly, concept D includes a time stamp including a starting position $S_{D\_0}$ and an ending position $E_{D\_0}$. With reference to FIG. 4, if the concept to present is concept B, then replaying the video segment 408 includes playing the video 520 from positions $S_{B\_0}$ to $E_{B\_0}$, and from $S_{B\_1}$ to $E_{B\_1}$. If the concept to present is concept D, then replaying the video segment 408 includes playing the video 520 from positions $S_{D\_0}$ to $E_{D\_0}$.

Figure 5B:
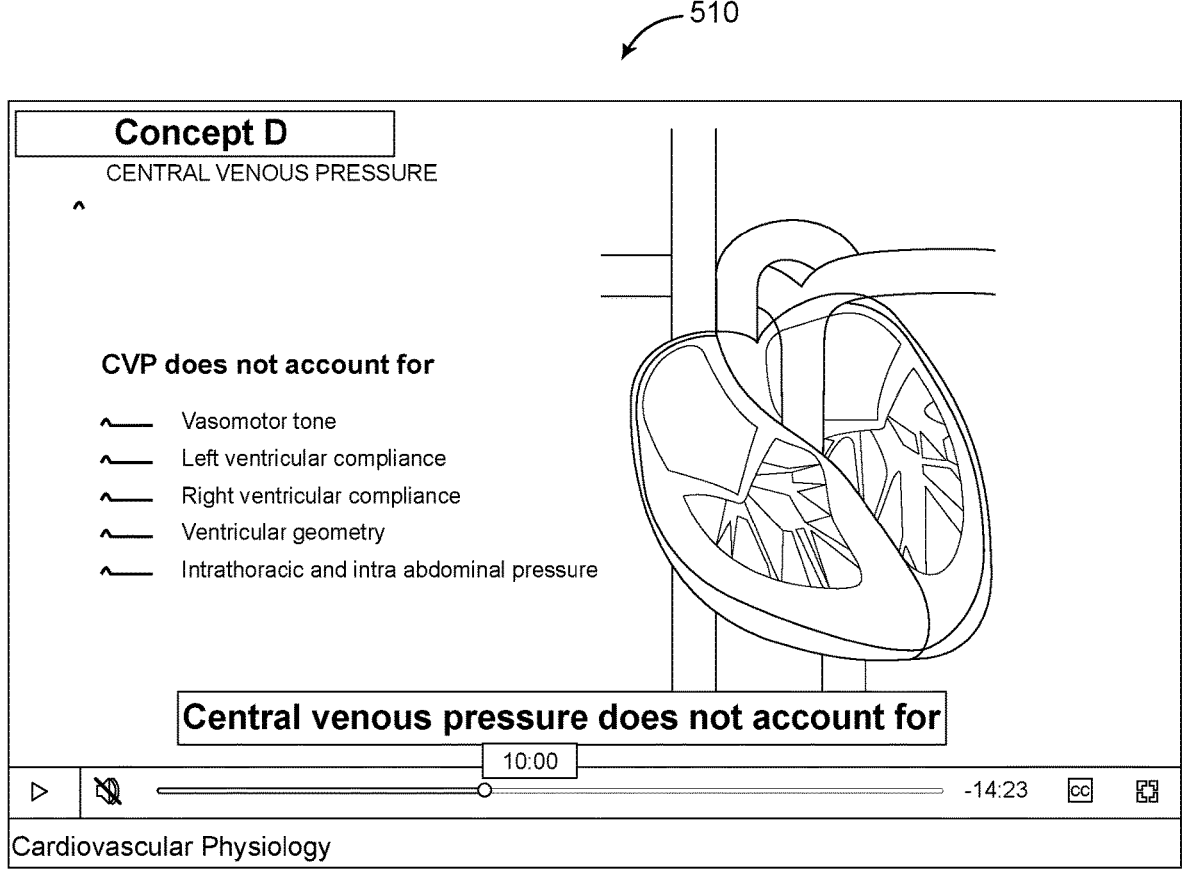
FIG. 5B illustrates an example graphical user interface for displaying multiple concepts tracked from a video according to various aspects of the present disclosure.

FIG. 5B illustrates an example graphical user interface for presenting video segments associated with a concept according to various aspects of the present disclosure. The graphical user interface may include a media player 510 configured to display a video segment. In the example above, the media player 510 is playing the video segment of concept D from positions $S_{D\_0}$ to $E_{D\_0}$.

Returning to FIG. 5A, while one or more video segments associated with a concept are being replayed in FIG. 5B, FIG. 5A may be displayed concurrently. In some examples, while a video segment is being played in the media player 510, the corresponding concept associated with that video segment is highlighted in the graphical user interface 520. For example, an indicator (e.g., an arrow) indicating the starting position and another indicator (e.g., an arrow) indicating the ending position of the video segment being replayed in 510 may be shown to indicate which video is being played and how long the video segment is. Additionally, and/or alternatively, an indicator (e.g., an arrow) may be shown to indicate the current position of the video segment being displayed in 510. It is appreciated that there are various ways of displaying starting, ending and/or current positions of a video. For example, the indicators may be arrows, or vertical lines or other graphics overlaid on the timeline or a particular region associated with the recommended concept (e.g., provided by recommender 110 in FIG. 1).

Additionally, and/or alternatively, the media presenter may be configured to show the distribution of concepts over time in video, virtual reality (VR) video and audio content (time-based content) via a visualization tool. The system will be able to automatically 'understand' the nature, depth and focus of any given time interval of video or VR multimedia and based on a user's model of knowledge/competence/confidence, will then predict which precise time intervals of multimedia content to send them to in order to best interrogate knowledge/aptitude/understanding, or to promote learning. New combinatorial multimedia experiences—which include parts of many different videos—can be arranged all without changing or editing the original files.

Returning to FIG. 4A, the process 400 may further include adjusting the starting and/or ending positions of the video segments at 412. This is also referred to as soft editing or soft transitions, or tapered transitions. The starting position or ending position associated with a concept may not be at a suitable point for starting or ending the replay of a video segment. For example, a starting position or an ending position may be in the middle of a sentence in the video, as such, replaying the video from the starting position or to the ending position may result in playing a "broken" video. The process 412 may adjust the starting and/or ending positions of each video segment so that the positions may be aligned with a key frame. A key frame in a video is where an event occurs. The event may include various types, such as a transition of a scene in the video, a cut in the video, or where an action in the video occurs (e.g., a motion of a subject is detected). In other examples, an event may also be detected based on the transition of audio signals (e.g., a transition from silence to a start of dialogue, or an audio fades off). In some examples, the process 412 may adjust the starting and/or ending position of the video by moving the starting point backward for a fixed period of time, e.g., 2 seconds, and/or moving the ending point forward for a fixed period time, e.g., 2 seconds. Other time shift may also be possible.

In some examples, the process 400 may adjust the audio and/or video at the starting and/or ending positions of the video segment at 410. For example, the process 410 may adjust the volume of the video segment to give the effect of fading-in at the start of the video segment and/or fading-out at the end of the video segment. There are other ways of adjusting the starting and/or ending positions.

The various embodiments of concept tracking described with reference to FIGS. 1-5 may facilitate a learning system to present the right contents (learning materials) suitable for a user's needs as the system assesses the user's knowledge level around the learning materials and recommend appropriate contents. For example, a large and lengthy video and VR video (360VR) files may be made more user friendly for the purpose of rapid personalized knowledge transfer. Each video and 360VR file may be analyzed by way of natural language processing of the text-based translation of audio narration and optical character recognition (OCR) or other forms of video analysis to generate text that represent the content of the video. In combination with custom downstream processing and data cleaning procedures which might include LDA, word embedding and Affinity Propagation it will be possible to extract the constituent concepts/topics which define the video/360VR content. These concepts will be described as a distribution normalized over the length of the 360VR file (e.g., in a media presenter).

The system may learn the assignment of probabilities/weights for each concept to each time interval, so that given any defined time interval, the system may predict how much this interval is 'about' each of the concepts, usually by returning a matrix representing distributions for each concept. A visualization of this 'concept track' could sit within the user interface for the 360VR experience (perhaps directly in the perceived position of users' feet) and would demonstrate the distribution of concepts covered over time. This would act as a useful guide for learners who would be able to understand if they are dealing with complex content (containing lots of different concepts/topics) or focused content (containing only one or a few major topics).

With learning capability, such as using machine learning techniques described in the present disclosure, concept tracking allows users to be driven through different time intervals from various video segments that are about a concept according to their precise needs and level. Consequently, users do not have to engage in watching superfluous information, or information that they already know.

In some examples, a system which may be implemented in various embodiments in the present disclosure may analyze a library of content to generate a relational, graphical database of 360VR content ('content space' 'space') with associated audio and textual information. The relational database may analyze content via natural language processing and/or computer vision to determine relationships and will then use the determined relationships to generate a concept list describing the space and its contents. Once the concept listing has been generated, the system may analyze the content library again to determine concept/topic probabilities for each item of content. The system may store each 360VR file as a 'node' within the content space and will form weighted edge links defining relationships and the determined probabilities for the various concepts which make up the content space. The concept probabilities help to define the specificity of a particular item to a particular topic/concept, such that the system can determine whether the content item is likely to have cursory information of a topic or more in-depth/specific information for the topic.

Figure 6:
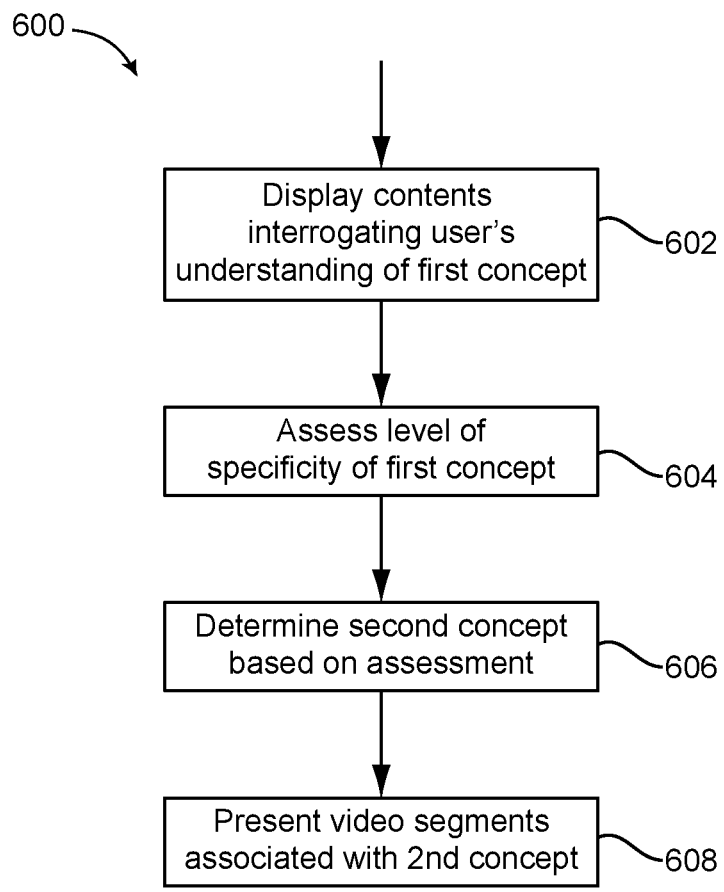
FIG. 6 illustrates an example process of adaptively presenting learning contents to a user in a learning system according to various aspects of the present disclosure.

Using the relational or content linked database, the system may recommend and present educational content items to a user for personalized learning. Once a user has engaged with a selected content item, the system can then recommend additional items based on the user's responses, response time, confidence level, enjoyment or usefulness ratings and so on. In this manner, the system will be configured to refine the content delivered to the user to hone in on the user's knowledge, aptitude or competency level to form the basis of a detailed user model which is updated as the user progresses though the content. Additionally, and/or alternatively, the system may recommend new multimedia content items by maximizing the user's probability of success around certain concepts that the user shows high proficiency in, or improving the user's proficiency around the concepts the user shows weakness in, FIG. 6 illustrates an example process of presenting contents to a user in a learning system according to various aspects of the present disclosure. A process 600 may be implemented in one or more components in the learning system 100 (in FIG. 1). In some examples, the process 600 may display contents interrogating a user's understanding of a first concept at 602. The contents for interrogating the user's standing may be displayed in the user interface (e.g., 114 in FIG. 1). The contents for interrogating may be relevant to a concept. For example, the concept may be recommended by the recommender (110 in FIG. 1), for which the system analyzes the competency of the user's learning. The contents relevant to the concept may include multiple questions for the user to respond. The system may assess the level of specificity for the user around the first concept at 604. In a non-limiting example, the system may receive the user's feedback to the questions via a user interface (e.g., 114 in FIG. 1) and determine the specificity of the user about the concept being assessed. In some examples, the process 604 may be implemented in the user knowledge assessor (112 in FIG. 1).

With further reference to FIG. 6, the process 600 may determine a second concept based on the assessment at 606. In some examples, the process 606 may be implemented in the recommender (e.g., 110 in FIG. 1), and thus, the process 606 may determine the knowledge level of the user around the concept earlier recommended. If the process determines that the user has not achieved a knowledge level about the concept, the process may continue presenting the learning materials around that concept. Alternatively, the process may determine that the user may need to improve certain sub-concepts of the concept. For example, whereas the user is being assessed on the competency about concept D, the process may recommend that the user improve the understanding of concept C. In such case, the process may present video segments (of the learning materials) associated with the second concept at 608. The second concept may be a new concept recommended by the process based on the assessment of the user's knowledge level about the first concept. Presenting the one or more video segments associated with a concept are described above with reference to FIGS. 4, 5A and 5B.

As shown in FIG. 6, the process 600 allows the system to analyze a user's performance on various concepts and adaptively present learning materials suitable for improving the user's learning experience. In a non-limiting example, the user is learning concepts P and Q. The system may index and find all video segments of all videos that deal with those concepts at the level of specificity that the user can currently deal with. For instance, if the system determines that the user's knowledge level about concept P is very highly and the user's knowledge level about concept Q is medium, then the system may find all intervals of all videos that might be talking about those two concepts in those proportions that the user can handle. The various embodiments in FIGS. 1-6 allow the system to be able to switch among different concepts to adapt to the user's learning needs by presenting learning contents that are only relevant to the user's learning or what would improve user's understanding of certain concepts.

In a non-limiting example, the system may determine that the user's knowledge levels on concepts P and Q are low, and the system may determine to find more introductory segments to help the user to learn more about the basics. In this case, by assessing the user's knowledge level, the system may recommend the next most appropriate concept and direct the user to the appropriate learning contents for the recommended concept. The learning contents appropriate for the recommended concept may be in the form of video or other multimedia.

Various embodiments in the present disclosure create a technical solution by which available text can be used to describe and predict the range and distribution of concepts over time. Concept tracking is implemented by identifying concepts ('contextualizing') within videos to produce a time series of concept probabilities for intervals of time over the length of a video. Thus, concept tracking allows a user to lookup all time intervals of all videos that are about a concept according to some predicate, e.g. greater than a certain probability or weight, and then present the selected contents to help drive up students' knowledge and understanding.

Further, the embodiments provided in the present disclosure allow users to "fly" through different video segments (e.g., via media presenter 122 in FIG. 1) based on the concepts they need to learn about, or prove comprehension/compliance, rather than watching lengthy videos which deal with unrequired or superfluous information, or information that is already known. With this solution, users will be able to 'jump' into and out of video content in line with their learning needs in a fully automated way.

Figure 7:
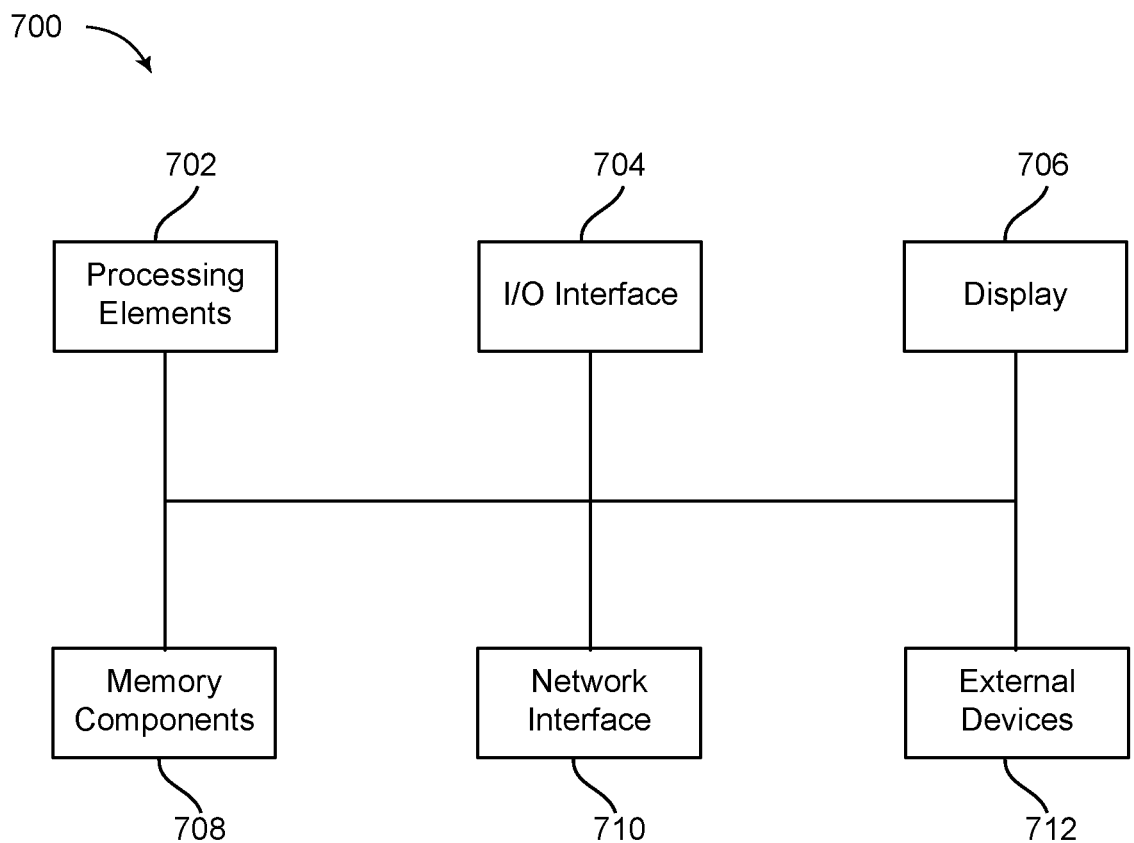
FIG. 7 illustrates an example block diagram of a computing device that can be used to implement various systems and methods described herein.

FIG. 7 shows a simplified block structure for a computing device that may be used with the system 100 (in FIG. 1) or integrated into one or more components of the system. For example, the recommender 110, contextualizer 102, knowledge acquisition unit 118, user knowledge assessor 112, A/V concept tracker 120, media presenter 122, or one or more user devices (not shown) that host the user interface 114 may include one or more of the components shown in FIG. 7 and be used to implement one or more blocks or execute one or more of the components or operations disclosed in FIGS. 1-6. In FIG. 7, the computing device 700 may include one or more processing elements 702, an input/output interface 704, a display 706, one or more memory components 708, a network interface 710, and one or more external devices 712. Each of the various components may be in communication with one another through one or more busses, wireless means, or the like.

The processing element 702 may be any type of electronic device capable of processing, receiving, and/or transmitting instructions. For example, the processing element 702 may be a central processing unit, microprocessor, processor, or microcontroller. Additionally, it should be noted that some components of the computer 700 may be controlled by a first processor and other components may be controlled by a second processor, where the first and second processors may or may not be in communication with each other.

The memory components 708 are used by the computer 700 to store instructions for the processing element 702, as well as store data, such as the knowledge base (e.g., 106, 108 in FIG. 1), and the like. The memory components 708 may be, for example, magneto-optical storage, read-only memory, random access memory, erasable programmable memory, flash memory, or a combination of one or more types of memory components.

The display 706 provides visual feedback to a user, such as displaying questions or content items or displaying recommended content, as may be implemented in the user interface 114 (FIG. 1). Optionally, the display 706 may act as an input element to enable a user to control, manipulate, and calibrate various components of the computing device 700. The display 706 may be a liquid crystal display, plasma display, organic light-emitting diode display, and/or other suitable display. In embodiments where the display 706 is used as an input, the display may include one or more touch or input sensors, such as capacitive touch sensors, resistive grid, or the like.

The I/O interface 704 allows a user to enter data into the computer 700, as well as provides an input/output for the computer 700 to communicate with other devices or services (e.g., recommender 110 in FIG. 1). The I/O interface 704 can include one or more input buttons, touch pads, and so on.

The network interface 710 provides communication to and from the computer 700 to other devices. For example, the network interface 710 allows various components in the system 100 (FIG. 1) to communicate with the recommender 110 through a communication network (in FIG. 1). The network interface 710 includes one or more communication protocols, such as, but not limited to WiFi, Ethernet, Bluetooth, and so on. The network interface 710 may also include one or more hardwired components, such as a Universal Serial Bus (USB) cable, or the like. The configuration of the network interface 710 depends on the types of communication desired and may be modified to communicate via WiFi, Bluetooth, and so on.

The external devices 712 are one or more devices that can be used to provide various inputs to the computing device 700, e.g., mouse, microphone, keyboard, trackpad, or the like. The external devices 712 may be local or remote and may vary as desired. In some examples, the external devices 712 may also include one or more additional sensors, such as sensor(s) 116 (in FIG. 1) that may be used in obtaining user's assessment variables.

The foregoing description has a broad application. For example, while examples disclosed herein may focus on central communication system, it should be appreciated that the concepts disclosed herein may equally apply to other systems, such as a distributed, central or decentralized system, or a cloud system. For example, recommender 110, or other components (in FIG. 1) may be residing on a server in a client/server system. The recommender may also be residing on any device on the network and operate in a decentralized manner. The recommender may also be residing in a controller virtual machine (VM) or a hypervisor in a VM computing environment. Accordingly, the disclosure is meant only to provide examples of various systems and methods and is not intended to suggest that the scope of the disclosure, including the claims, is limited to these examples.

Various embodiments described in FIGS. 1-7 may provide technical solutions that are advantageous over existing solutions. For example, the A/V concept tracker (e.g., 120 in FIG. 1) breaks down each content in the learning materials into one or more concept. This facilitates the system to recommend learning materials about certain concepts to a user based on an assessment of the user's competency about the concepts. The system may adaptively present the learning materials only relevant to the recommended concepts and display the contents associated with the concepts of interest without replaying the entire contents in the learning materials.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The drawings are for purposes of illustration only and the dimensions, positions, order and relative sizes reflected in the drawings attached hereto may vary. In each of the figures, like numerals represent like items throughout the figures.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific embodiments of the present disclosure have been described herein for purposes of illustration, various modifications and combinations may be made without deviating from the spirit and scope of the present disclosure. For example, although various embodiments are described to use word embedding in concept tracker, other models, such as LDA model training, non-LDA based methods may also be used. The systems and methods described herein may also be applied to other recommendation applications or learning management systems. It may be appreciated that various modifications to the disclosure may be readily apparent, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A computer-implemented method of recommending content items, the method comprising:
    determining, via a processor, at least one user characteristic of a user based on user engagement with at least a first content item stored in a knowledge base, wherein the first content item is stored in the knowledge base according to a linking structure based on a first concept associated with the first content item, and wherein the knowledge base and first content item are stored in one or more memory components accessible by the processor;
    generating, via the processor, a user model configured to predict a knowledge level of the user, wherein the user model comprises a set of nodes based on the at least one user characteristic, and wherein the user model comprises a factor graph that includes the set of nodes;
    applying, via the processor, the user model to predict the knowledge level;
    generating, via the processor, a recommendation of at least a portion of a second content item based, at least in part, on the predicted knowledge level, wherein the at least a portion of the second content item is stored in the knowledge base according to a linking structure based on a second concept associated with the at least a portion of the second content item, and wherein the second content item is stored in the one or more memory components accessible by the processor; and
    displaying, via the processor, the at least a portion of the second content item via a graphical user interface.

2. The computer-implemented method of claim 1, wherein the factor graph represents a joint probability mass function of at least one variable associated with the user.

3. The computer-implemented method of claim 1, wherein the at least a portion of the second content item is recommended based on the second concept associated with the at least a portion of the second content item.

4. The computer-implemented method of claim 1, wherein applying the user model to predict the knowledge level includes evaluating a response by the user to the first content item.

5. The computer-implemented method of claim 1, wherein the at least one user characteristic includes a current state of a set of variables associated with user behaviors when responding to content items.

6. The computer-implemented method of claim 5, wherein the set of variables includes at least one of: confidence, veracity, level of specificity of a concept in a learning space, attention level, or response time.

7. The computer-implemented method of claim 1, further comprising:
    receiving feedback from the user or an external source; and
    updating the user model based on the received feedback.

8. The computer-implemented method of claim 1, wherein the at least a portion of the second content item comprises a segment of an audio/video media including a starting position and an ending position of the audio/video media.

9. The computer-implemented method of claim 1, wherein the graphical user interface comprises:
    a display of the at least a portion of the second content item; and
    a concept indicator associated with a concept associated with the at least a portion of the second content item.

10. The computer-implemented method of claim 9, wherein the graphical user interface further comprises a concept map associated with a concept associated with the at least a portion of the second content item.

11. At least one non-transitory computer-readable medium carrying instructions that, when executed by a processor, cause the processor to perform operations comprising:
    determine at least one user characteristic of a user based on user engagement with at least a first content item stored in a knowledge base, wherein the first content item is stored in the knowledge base according to a linking structure based on a first concept associated with the first content item, and wherein the knowledge base and first content item are stored in one or more memory components accessible by the processor;
    generate a user model configured to predict a knowledge level of the user, wherein the user model comprises a set of nodes based on the at least one user characteristic, and wherein the user model comprises a factor graph that includes the set of nodes;
    apply the user model to predict the knowledge level;
    generate a recommendation of at least a portion of a second content item based, at least in part, on the predicted knowledge level, wherein the at least a portion of the second content item is stored in the knowledge base according to a linking structure based on a second concept associated with the at least a portion of the second content item, and wherein the second content item is stored in the one or more memory components accessible by the processor; and
    display the at least a portion of the second content item via a graphical user interface.

12. The at least one non-transitory computer-readable medium of claim 11, wherein the factor graph represents a joint probability mass function of at least one variable associated with the user.

13. The at least one non-transitory computer-readable medium of claim 11, wherein the at least a portion of the second content item is recommended based on the second concept associated with the at least a portion of the second content item.

14. The at least one non-transitory computer-readable medium of claim 11, wherein applying the user model to predict the knowledge level includes evaluating a response by the user to a particular content item.

15. The at least one non-transitory computer-readable medium of claim 11, wherein the at least one user characteristic includes a current state of a set of variables associated with user behaviors when responding to content items.

16. The at least one non-transitory computer-readable medium of claim 15, wherein the set of variables includes at least one of: confidence, veracity, level of specificity of a concept in a learning space, attention level, or response time.

17. The at least one non-transitory computer-readable medium of claim 11, wherein the operations further comprise:
   receive feedback from the user or an external source; and
   update the user model based on the received feedback.

18. The at least one non-transitory computer-readable medium of claim 11, wherein the at least a portion of the second content item comprises a segment of an audio/video media including a starting position and an ending position of the audio/video media.

\* \* \* \* \*